(12) United States Patent
Song et al.

(10) Patent No.: US 12,013,628 B2
(45) Date of Patent: Jun. 18, 2024

(54) METHODS FOR EVALUATING PERFORMANCE OF IMAGE SENSORS AND/OR SELECTING SETTINGS OF IMAGE SENSORS

(71) Applicant: Samsung Electronics Co., Ltd., Suwon-si (KR)

(72) Inventors: Dongyoung Song, Suwon-si (KR); Seungwan Jeon, Suwon-si (KR); Kichrl Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/183,890

(22) Filed: Mar. 14, 2023

(65) Prior Publication Data

US 2024/0053667 A1 Feb. 15, 2024

(30) Foreign Application Priority Data

Aug. 10, 2022 (KR) ........................ 10-2022-0099696

(51) Int. Cl.
G03B 43/00 (2021.01)
(52) U.S. Cl.
CPC .................................. G03B 43/00 (2013.01)
(58) Field of Classification Search
CPC .............................. G03B 43/00; H04N 9/3191
See application file for complete search history.

(56) References Cited

U.S. PATENT DOCUMENTS

| | | |
|---|---|---|
| 8,610,981 B2 | 12/2013 | Ohkawa |
| 10,750,068 B2 | 8/2020 | Chang et al. |
| 2021/0195154 A1* | 6/2021 | Fan ...................... H04N 9/3182 |

FOREIGN PATENT DOCUMENTS

| | | |
|---|---|---|
| JP | 2004140450 A | 5/2004 |
| JP | 2006245891 A | 9/2006 |
| JP | 2008227999 A | 9/2008 |
| JP | 4981714 B2 | 4/2012 |
| KR | 20080089004 A | 10/2008 |
| KR | 20130052188 A | 5/2013 |

* cited by examiner

*Primary Examiner* — Minh Q Phan
(74) *Attorney, Agent, or Firm* — Myers Bigel, P.A.

(57) ABSTRACT

Methods of adjusting an image sensor may be provided. A test image of a test chart including an evaluation area may be obtained using the image sensor. The evaluation area may have a shape of a circle, wherein the evaluation area includes first through nth unit areas arranged in a rotational direction around the circle, and wherein each of the first through nth unit areas has a different level of brightness. A signal-to-noise ratio (SNR) may be calculated for each of the first through $n^{th}$ unit areas based on the test image of the test chart. A setting of the image sensor may be adjusted based on calculating the signal-to-noise ratio for each of the first through $n^{th}$ unit areas.

20 Claims, 29 Drawing Sheets

METHODS FOR EVALUATING PERFORMANCE OF IMAGE SENSORS AND/OR SELECTING SETTINGS OF IMAGE SENSORS

CROSS TO REFERENCE TO RELATED APPLICATION

This application claims the benefit of priority to Korean Patent Application No. 10-2022-0099696 filed on Aug. 10, 2022, in the Korean Intellectual Property Office, the disclosure of which is hereby incorporated herein by reference in its entirety.

BACKGROUND

The present disclosure relates to methods of evaluating performance of an image sensor and/or improving/optimizing settings of an image sensor.

An image sensor may be a semiconductor-based sensor receiving light and generating an electrical signal in response to the received light, and such a sensor may be mounted on a camera device. The quality of an image output by an image sensor included in a camera device may vary depending on changeable settings in the image sensor. To improve/optimize performance of the image sensor, it may be useful/necessary to accurately evaluate performance, and to evaluate performance of the image sensor, an operation of generating a test image may be performed by imaging a test chart. Accordingly, an effectively constructed a test chart may be useful.

SUMMARY

Some example embodiments of the present disclosure may provide methods of evaluating performance of an image sensor and/or methods of adjusting/improving/optimizing settings of an image sensor by which performance of the image sensor may be evaluated using a test chart configured to accurately evaluate performance of the image sensor, and performance of the image sensor may be improved/optimized therefrom.

According to some example embodiments of the present disclosure, methods of evaluating performance of an image sensor may be provided. A plurality of test images may be obtained by imaging a test chart multiple times using a camera device including an image sensor, and the test chart may include an evaluation area of which brightness changes along a predetermined first direction. The plurality of test images may be generated such that the evaluation area is disposed at a center of each of the plurality of test images, and the first direction may be a direction of rotation from a predetermined reference axis. A signal-to-noise ratio may be calculated depending on a position of the evaluation area in each of the plurality of test images, and performance of the image sensor may be evaluated based on the signal-to-noise ratio.

According to some example embodiments of the present disclosure, methods of selecting settings for an image sensor may be provided. A test image may be obtained by imaging a test chart including an evaluation area using an image sensor, wherein the evaluation area of the test image has a circular shape displayed at a center of the test image. A signal-to-noise ratio of each of a plurality of unit areas in the test image may be calculated, wherein the evaluation area includes the plurality of unit areas disposed in a clockwise direction and having different levels of brightness. A setting of the image sensor may be selected based on the signal-to-noise ratio calculated in each of the plurality of unit areas.

According to some example embodiments of the present disclosure, methods of evaluating performance of an image sensor may be provided. A test image may be obtained by imaging an evaluation area, wherein the evaluation area includes a plurality of unit areas having different levels of brightness. An average level code of a pixel in each of the plurality of unit areas displayed in the test image may be obtained. A signal-to-noise ratio of each of brightness, red color, green color, and blue color in each of the plurality of unit areas displayed in the test image may be obtained. A ratio between the signal-to-noise ratio of at least one of the red color and the blue color and the signal-to-noise ratio of the green color in each of the plurality of unit areas displayed in the test image may be calculated. Performance of an image sensor imaging the evaluation area may be evaluated based on at least a portion of the average level code, the signal-to-noise ratio, and the ratio in each of the plurality of unity areas displayed in the test image.

According to some example embodiments of the present disclosure, methods of adjusting an image sensor may be provided. A test image of a test chart including an evaluation area using the image sensor may be obtained. The evaluation area may have a shape of a circle, wherein the evaluation area includes first through $n^{th}$ unit areas arranged in a rotational direction around the circle, and wherein each of the first through $n^{th}$ unit areas has a different level of brightness. A signal-to-noise ratio (SNR) may be calculated for each of the first through $n^{th}$ unit areas based on the test image of the test chart. A setting of the image sensor may be adjusted based on calculating the signal-to-noise ratio for each of the first through $n^{th}$ unit areas.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the accompanying drawings.

Figure 1:
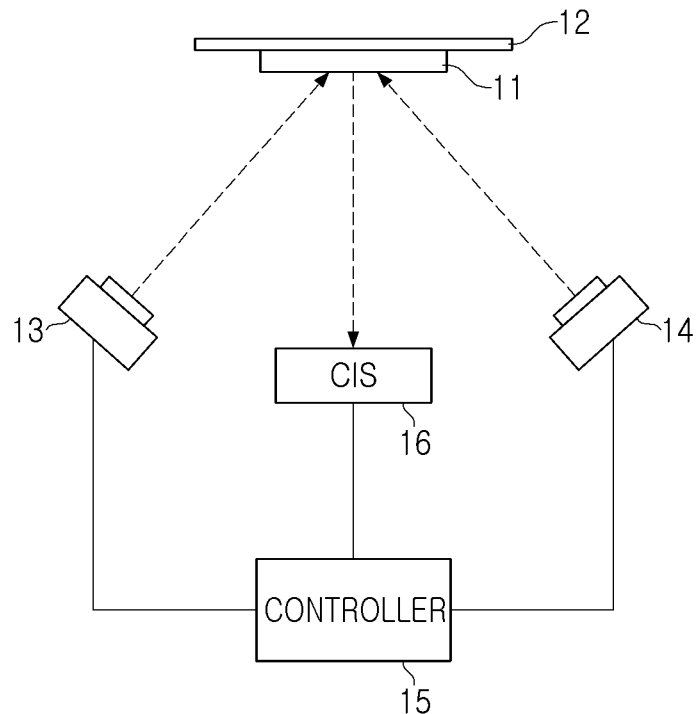
FIG. 1 is a diagram illustrating a device to evaluate performance of an image sensor according to some example embodiments of the present disclosure.

FIG. 1 is a diagram illustrating a device used to evaluate performance of an image sensor according to an example embodiment.

Referring to FIG. 1, a device 10 for evaluating performance of an image sensor may include a test chart 11, a stage 12 on which the test chart 11 is mounted, lighting units 13 and 14 used to irradiate light onto the test chart 11, and a controller 15. The image sensor 16, which is a target of performance evaluation, may be connected to the controller 15, and may output a test image by imaging the test chart 11.

The controller 15 may include an image signal processor generating an image using pixel data output by the image sensor 16, and may obtain a plurality of test images of the test chart 11 by changing settings of the image sensor 16 for the different test images. For example, the image sensor 16 may provide a dual conversion gain (DCG) function of adjusting a conversion gain of pixels according to brightness of a subject, and may operate in HDR (high dynamic range) mode in which the subject is displayed in an image using pixel data obtained under different conversion gain conditions.

In an example embodiment, the test chart 11 may include an evaluation area in which a plurality of unit areas having different levels of brightness are disposed. The image sensor 16 may generate a test image by imaging the test chart 11 such that the evaluation area is displayed. For example, at least a portion of the plurality of unit areas included in the evaluation area may be displayed in the test image in the HDR mode.

In the HDR mode, an image may be generated by combining pixel data obtained under different conversion gain conditions. For example, an image may be generated by assigning predetermined weights to pixel data obtained under different conversion gain conditions and combining the data. For example, weights assigned to each piece of pixel data of a low gain conversion condition and pixel data of a high conversion gain condition in the HDR mode may be defined as a DCG setting of the image sensor 16. In this case, a signal-to-noise ratio dip (SNR dip), in which a signal-to-noise ratio may significantly deteriorate at a specific brightness depending on the weight provided to each piece of pixel data obtained under the low conversion gain condition and the pixel data obtained under the high conversion gain condition, may appear.

In an example embodiment, it may be accurately determined whether an SNR dip appears at a specific brightness when the image sensor 16 operates in the HDR mode without being affected by other settings. To this end, the evaluation area having a plurality of unit areas having different levels of brightness in the test chart 11 may be disposed adjacent to the center of the test chart 11 rather than the edge. Accordingly, regardless of whether the lens shading correction (LSC) function is activated, it may be accurately evaluated whether an SNR dip appears at a specific brightness while the image sensor 16 operates in the HDR mode, and based on the evaluation result, the DCG settings to improve/optimize the HDR mode of the image sensor 16 may be found.

Figure 2:
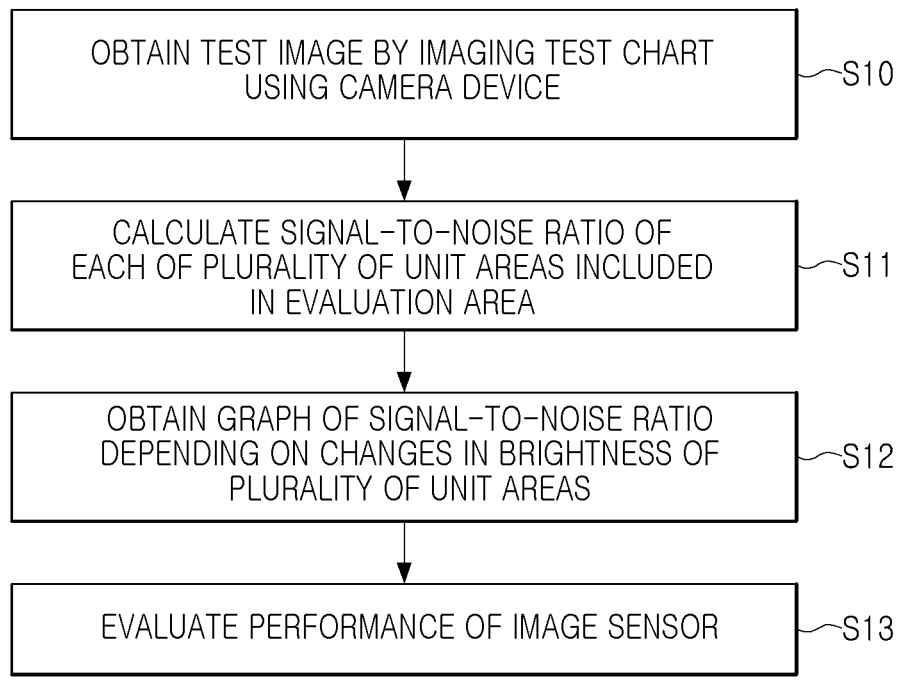
FIG. 2 is a flowchart illustrating methods of evaluating performance of an image sensor according to some example embodiments of the present disclosure.

FIG. 2 is a flowchart illustrating a method of evaluating performance of an image sensor according to an example embodiment.

Referring to FIG. 2, a method for evaluating performance of an image sensor according to an example embodiment may start with obtaining a test image by imaging a test chart with a camera device (at operation S10). The camera device may include an image sensor to evaluate performance, and light reflected from a test chart and passing through an optical module having a plurality of lenses may be incident on the image sensor.

The test image may be generated by a controller connected to an image sensor of the camera device. The controller may include an image signal processor generating a test image using pixel data output by the image sensor, and may control lighting units of the device that are used to evaluate performance, and may control an optical module included in the camera device. For example, the controller may adjust a focal length of the optical module such that the evaluation area included in the test chart may be disposed in the center of the test image.

A plurality of unit areas having different levels of brightness may be disposed in the evaluation area of the test chart. In the test chart according to an example embodiment, the evaluation area may be disposed in the center of the test chart and may have a circular shape. Each of the plurality of unit areas may have a sectoral shape, and may be disposed in a clockwise or counterclockwise direction within the evaluation area. For example, a plurality of unit areas may be disposed such that brightness may increase or decrease in a clockwise or counterclockwise direction.

When the test image is obtained, the controller may calculate a signal-to-noise ratio in the evaluation area displayed in the test image (at operation S11). For example, the controller may calculate a signal-to-noise ratio of each of a plurality of unit areas included in the evaluation area. The controller may obtain a signal-to-noise ratio of each of the plurality of unit areas from pixels separated from each other by a predetermined distance from the center of the evaluation area.

Thereafter, the controller may obtain a signal-to-noise ratio graph depending on changes in brightness of a plurality of unit areas (at operation S12). As described above, the plurality of unit areas having different levels of brightness may be disposed such that brightness may increase or decrease in a clockwise or counterclockwise direction within the evaluation area. Accordingly, the signal-to-noise ratio graph generated by the controller at operation S12 may be defined according to the brightness of each of the plurality of unit areas displayed in the test image and a rotation angle in the test image with respect to a predetermined reference axis.

The controller may evaluate performance of the image sensor using the signal-to-noise ratio graph generated at operation S12 (at operation S13). Since a plurality of unit areas having different levels of brightness are included in the evaluation area, when the HDR mode of the image sensor is activated, at least a portion of the plurality of unit areas displayed in the test image may be represented as a combination of pixel data obtained under different conversion gain conditions.

However, as described above, when an image is generated using pixel data obtained under different conversion gain conditions, an SNR dip in which the signal-to-noise ratio decreases at a specific brightness may occur. For example, the signal-to-noise ratio obtained in each of the plurality of unit areas may have a tendency to appear larger as the brightness of each of the plurality of unit areas increases. Accordingly, when the signal-to-noise ratio decreases at a specific brightness of the image differently from the above tendency, it may be determined that the SNR dip has occurred at the corresponding brightness.

When an SNR dip appears at a specific brightness, the controller may evaluate performance of the image sensor as bad, and may change the settings of the image sensor. Hereinafter, a method of improving/optimizing the settings of the image sensor according to a result of performance evaluation will be described with reference to FIG. 3.

Figure 3:
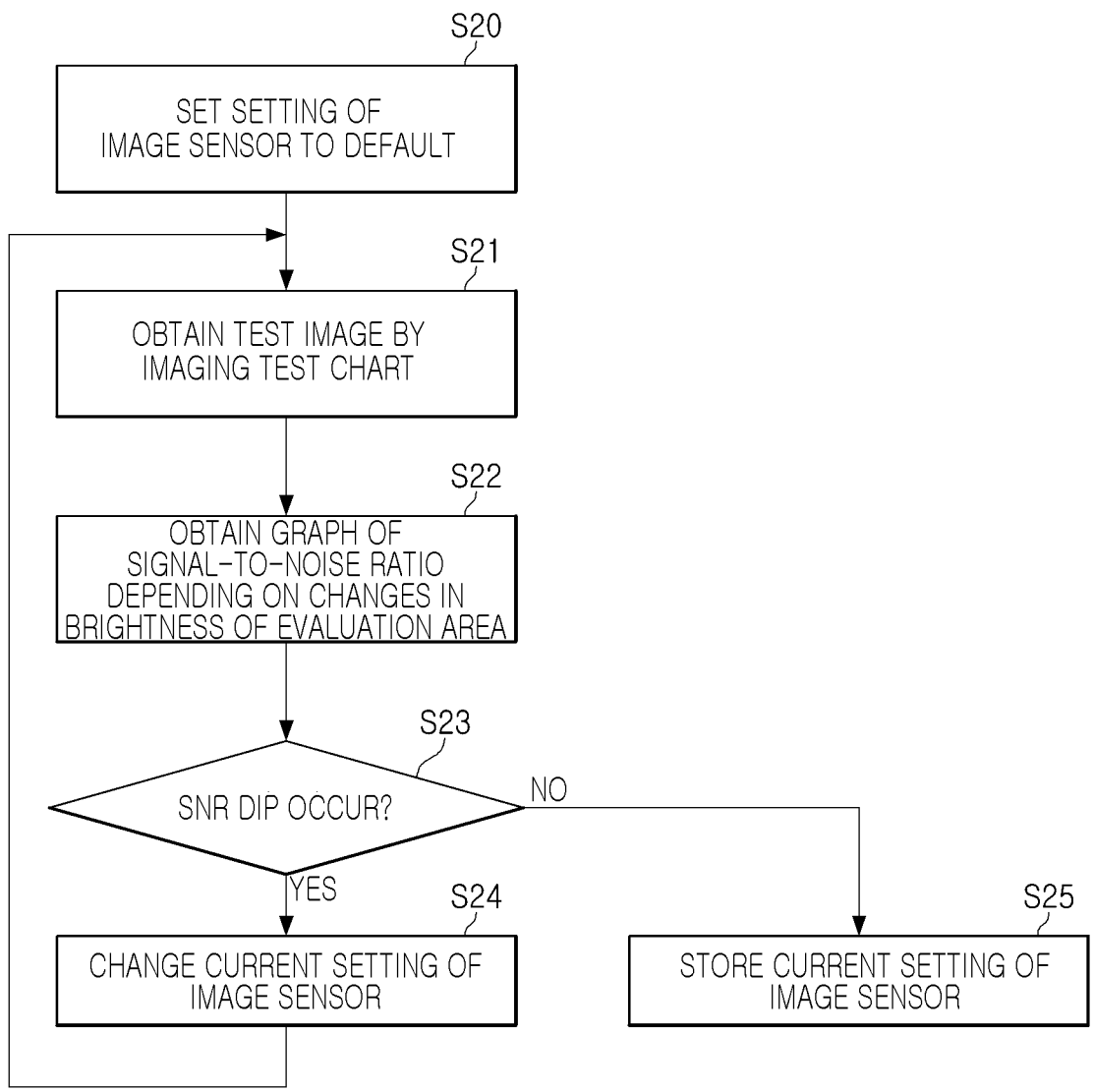
FIG. 3 is a flowchart illustrating methods of improving/optimizing settings of an image sensor according to some example embodiments of the present disclosure.

FIG. 3 is a flowchart illustrating a method of improving/optimizing settings of an image sensor according to an example embodiment.

Referring to FIG. 3, the method for improving/optimizing settings of an image sensor according to an example embodiment may start with setting the settings of the image sensor to a default value (at operation S20). For example, the settings of the image sensor determined in operation S20 may include a DCG setting. By the DCG setting, weights provided to pixel data obtained under a low conversion gain condition and pixel data obtained under a high conversion gain condition may be determined when the image sensor operates in the HDR mode.

Thereafter, a test image may be obtained by imaging a test chart to test the image sensor (at operation S21), and a graph of the signal-to-noise ratio according to changes in brightness of the evaluation area displayed in the test image may be obtained (at operation S22). The operations S21 and S22 may be understood with reference to the example embodiment described above with reference to FIG. 2.

For example, an evaluation area having a circular shape may be disposed in the center of the test chart, and the evaluation area may include a plurality of unit areas each having a sector shape. The plurality of unit areas may have different levels of brightness, and may be disposed in the evaluation area such that brightness may increase or decrease in a clockwise or counterclockwise direction from a predetermined reference axis. When the test image is generated, the controller connected to the image sensor may obtain a signal-to-noise ratio of pixels disposed in the evaluation area separated by a predetermined distance from the center of the test image, and may form a graph of the ratio.

The controller may determine whether an SNR dip occurs in the signal-to-noise ratio graph (at operation S23). For example, when it is assumed that first to $n^{th}$ unit areas are disposed in the evaluation area, the first unit area has the highest/brightest brightness and the $n^{th}$ unit area has the lowest/darkest brightness, a graph representing changes in the signal-to-noise ratio from the first unit area to the $n^{th}$ unit area may be generated in operation S22. In example embodiments, an SNR dip in which a signal-to-noise ratio is greatly reduced at a specific brightness, that is, a specific unit area, may appear.

When the SNR dip is confirmed at operation S23, the controller may change the current setting of the image sensor (at operation S24). For example, the controller may change the DCG setting of the image sensor to adjust weights provided to pixel data obtained under a low conversion gain condition and pixel data obtained under a high conversion gain condition, respectively. Thereafter, a test image may be obtained by imaging the test chart again with the image sensor of the changed setting, and whether the SNR dip appears may be identified by generating a signal-to-noise ratio graph. When the SNR dip is not confirmed in operation S23, the controller may store the current setting of the image sensor as is (at operation S25).

Figure 4A:
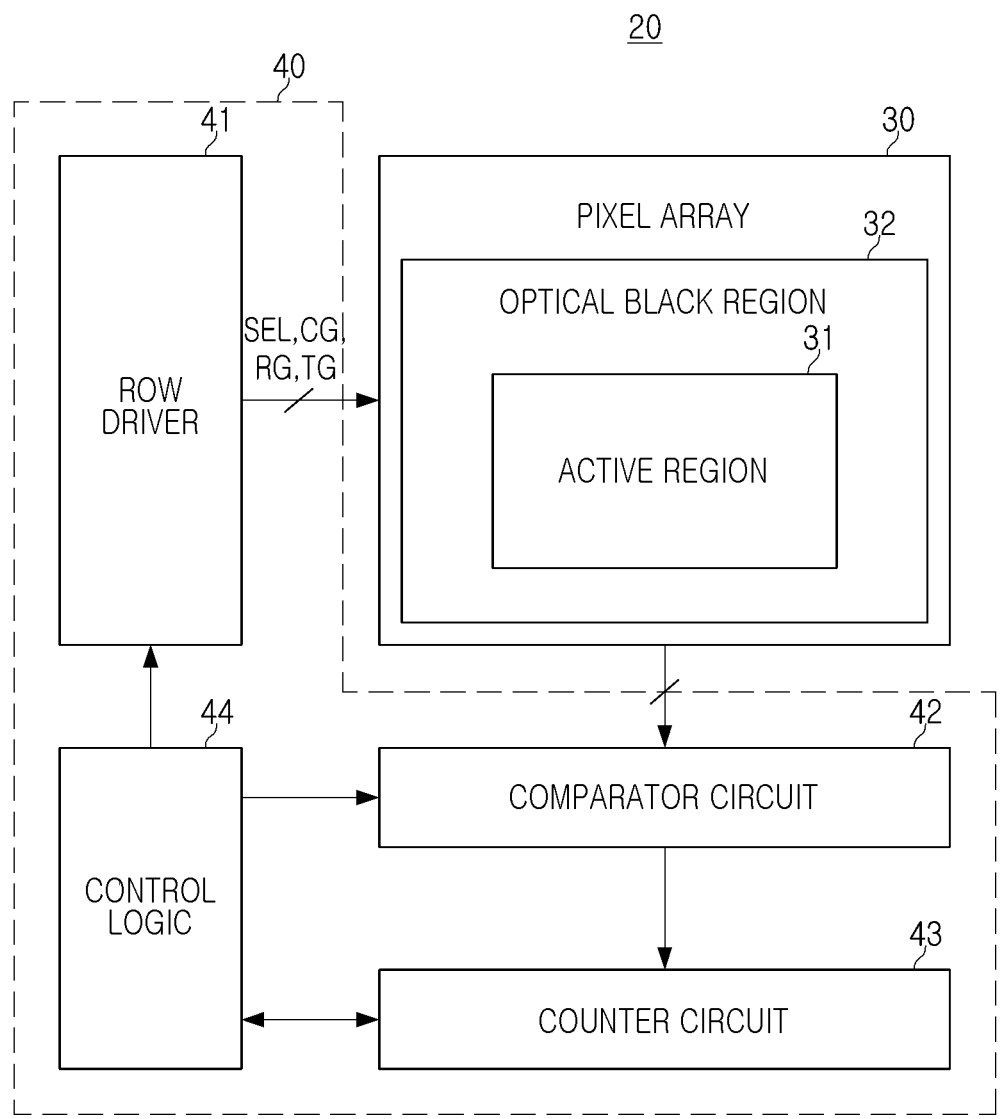
FIGS. 4A and 4B are diagrams illustrating an image sensor according to some example embodiments of the present disclosure.
Figure 4B:
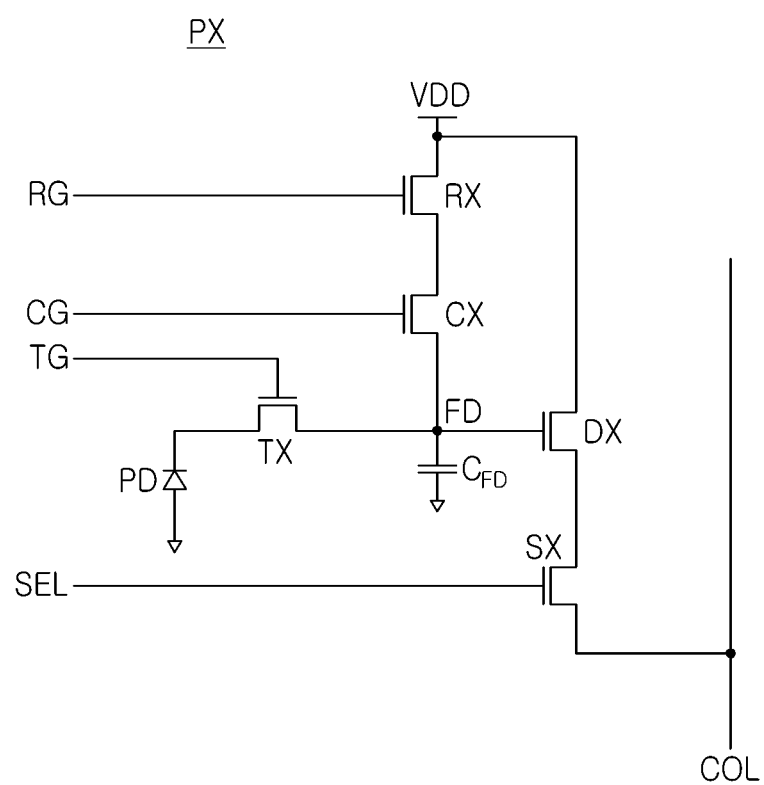

FIGS. 4A and 4B are diagrams illustrating an image sensor according to an example embodiment.

Referring to FIG. 4A, the image sensor 20 may include a pixel array 30 and a logic circuit 40.

The pixel array 30 may include a plurality of pixels disposed in an array form along a plurality of rows and a plurality of columns. Each of the plurality of pixels may include at least one photoelectric conversion device generating electric charges in response to light, and a pixel circuit generating a voltage signal corresponding to electric charges generated by the photoelectric conversion device. The photoelectric conversion device may include a photodiode formed of a semiconductor material, and/or an organic photodiode formed of an organic material.

For example, the pixel circuit may include a transfer transistor, a floating diffusion, a reset transistor, a driving transistor, and a select transistor. The configuration of pixels may vary in example embodiments. For example, each of the pixels may include an organic photodiode including an organic material, or may be implemented as a digital pixel. When the pixels are implemented as digital pixels, each of the pixels may include an analog-to-digital converter used to output a digital pixel signal. Each of the pixels may also include a control transistor coupled to the floating diffusion to adjust the conversion gain.

Pixels may be disposed in an active region 31 and an optical black region 32 included in the pixel array 30. For example, each of the pixels disposed in the active region 31 may include an optical area transmitting light, and pixels disposed in the optical black region 32 may include a light blocking layer for blocking light. The optical area may include a microlens used to refract light and to allow the light to be incident on a photoelectric conversion device such as a photodiode, and a color filter through which light of a specific wavelength band is allowed to pass.

The logic circuit 40 may include circuits used to control the pixel array 40. For example, the logic circuit 40 may include a row driver 41, a comparator circuit 42, a counter circuit 43, and a control logic 44. The row driver 41 may drive the pixel array 30 in units of row lines. For example, the row driver 41 may generate a transfer control signal TG used to control the transfer transistor of the pixel circuit, a reset control signal RG used to control the reset transistor, a select control signal SEL used to control the select transistor, and a control signal CG used to adjust a conversion gain, and the row driver 41 may input the signals to the pixel array 30 in a row line unit.

The comparator circuit 42 may include a plurality of comparators used to compare a voltage output by each of the pixels disposed in the pixel array 40 with a ramp voltage decreasing or increasing at a predetermined slope. For example, the output of the comparator may be changed based on a time point at which the ramp voltage has the same magnitude as that of the voltage output by each of the pixels. The counter of the counter circuit 43 may count the time until the time point at which the output of the comparator changes, and may digitally output the value. For example, the counter may generate a reset digital count value while the comparator receives a reset voltage from the pixel, and may generate a signal digital count value while the comparator receives a pixel voltage from the pixel.

The control logic 44 may generate pixel data corresponding to a difference between the reset digital count value and the signal digital count value. The control logic 44 may include a timing controller used to control operation timings of the row driver 41, the comparator circuit 42, and the counter circuit 43.

The pixels PX disposed in the same position in the vertical direction among the pixels PX may share the same column line. For example, the pixels PX disposed in the same position in the horizontal direction may be simultaneously selected by the row driver 41 and may output pixel signals through connected column lines. In an example embodiment, the CDS circuit 42 may simultaneously receive voltage signals from pixels selected by the row driver 41 through column lines. For example, the CDS circuit 42 may receive a reset voltage and a pixel voltage in sequence from each of the pixels, and the pixel voltage may be obtained by reflecting electric charges generated by a photodiode of each of the pixels in the reset voltage.

FIG. 4B is a circuit diagram illustrating a pixel PX that may be included in the pixel array 30. Referring to FIG. 4B, the pixel PX may include a photodiode PD generating electric charges in response to light, and a plurality of devices used to convert electric charges generated by the photodiode PD into electrical signals. For example, the plurality of devices may include a reset transistor RX, a driving transistor DX, a transfer transistor TX, a select transistor SX, and a control transistor CX. A floating diffusion FD may be defined between the transfer transistor TX and the driving transistor DX, and the floating diffusion FD may function as a capacitor CFD having a predetermined capacitance.

In a reset operation, the transfer transistor TX, the control transistor CX, and the reset transistor RX may be respectively turned on by the transfer control signal TG, the control signal CG, and the reset control signal RG. Accordingly, electric charges of the photodiode PD and electric charges of the capacitor CFD of the floating diffusion FD may be removed by the power supply voltage VDD, and the reset voltage may be output through the column line COL. Thereafter, during an exposure time in which the transfer transistor TX is turned off using the transfer control signal TG, the photodiode PD may be exposed to light and may generate electric charges.

When the exposure time elapses, the transfer transistor TX may be turned on and the electric charges of the photodiode PD may move to the floating diffusion FD. A pixel voltage may be output to the column line COL by electric charges moving from the photodiode PD to the floating diffusion FD. The logic circuit 40 may generate pixel data using a difference between the reset voltage and the pixel voltage.

In a state in which the control transistor CX is turned off, capacitance of the floating diffusion FD may be determined to be relatively small, and in a state in which the control transistor CX is turned on, capacitance of the floating diffusion FD may be determined to be relatively high. Accordingly, the conversion gain of the pixel PX may be increased by turning the control transistor CX off, and the conversion gain of the pixel PX may be decreased by turning the control transistor CX on.

The image sensor 20 may adjust the conversion gain of the pixel PX depending on brightness of a subject. Also, in the HDR mode, the image sensor 20 may generate an image by combining pixel data obtained under a high conversion gain condition by turning off the control transistor CX, and pixel data obtained under a low conversion gain condition by turning on the control transistor CX. For example, the image sensor 20 may generate an image by assigning a predetermined weight to each of the pixel data obtained under the high conversion gain condition and the pixel data obtained under the low conversion gain condition and combining the pixel data.

As described above, by generating an image using the pixel data obtained under the high conversion gain condition and the pixel data obtained under the low conversion gain condition, the image sensor 20 may improve a dynamic range. However, the signal-to-noise ratio may be lowered at a specific brightness of the image depending on the weight provided to each of the pixel data obtained under the high conversion gain condition and the pixel data obtained under the low conversion gain condition.

In the example embodiment, a method for improving/optimizing a weight provided to pixel data in an HDR mode may be suggested. A plurality of unit areas of which brightness may continuously change may be disposed in the evaluation area of the test chart, and the signal-to-noise ratio may be calculated from a test image obtained by imaging the evaluation area, thereby finding the brightness at which the signal-to-noise ratio is lowered. When the signal-to-noise ratio is lowered at a specific brightness, the settings of the image sensor may be improved/optimized by adjusting weights provided to pixel data in the HDR mode of the image sensor.

Figure 5:
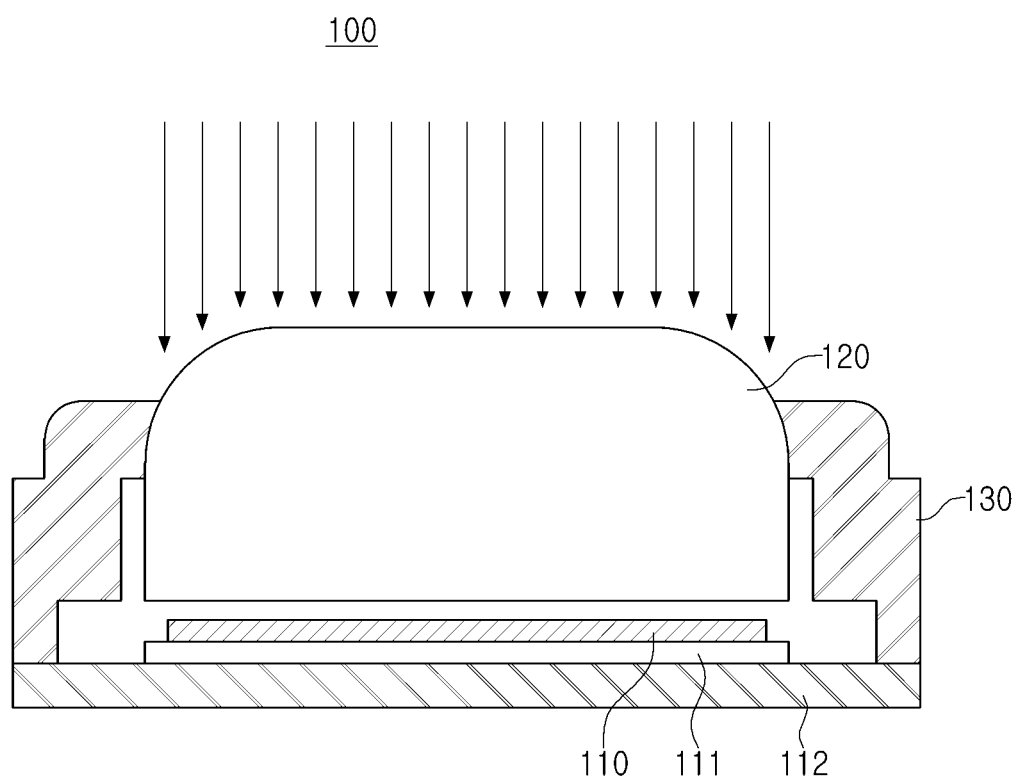
FIG. 5 is a diagram illustrating a camera device in which an image sensor is mounted according to some example embodiments of the present disclosure.

FIG. 5 is a diagram illustrating a camera device in which an image sensor is mounted according to an example embodiment.

Referring to FIG. 5, the camera device 100 may include an image sensor 110, a circuit board 111 on which the image sensor 110 is mounted, a module board 112, an optical module 120, and a housing 130. The optical module 120 may include a plurality of lenses, and light passing through the plurality of lenses may be incident on the pixel array of the image sensor 110.

The image sensor 110 may be mounted on the circuit board 111, may receive a control command from an external entity through wiring patterns formed on the circuit board 111 and the module board 112, and may output pixel data to an external entity. Alternatively, when the image signal processor is included in the camera device 100, image data generated based on pixel data generated by the image sensor 110 may be output to an external entity.

As illustrated in FIG. 5, the optical signal incident on the optical module 120 may have a weaker intensity as the signal approaches the edge of the pixel array included in the image sensor 110. To compensate for a difference in intensity of the optical signal, the image sensor 110 may provide a lens shading correction (LSC) function. When the LSC function is activated, the image sensor 110 may amplify pixel data output by pixels adjacent to the edge by providing a predetermined weight to the pixel data.

As described above, to evaluate performance of the image sensor 110, a test image may be obtained by imaging a test chart in which an evaluation area having a plurality of unit areas having different levels of brightness is disposed, and performance of the image sensor 110 may be evaluated using the image. However, when the evaluation area is disposed at the edge of the test chart, brightness of the evaluation area may appear differently in the test image depending on whether the LSC function is activated, and it may be difficult to accurately determine whether properties such as the signal-to-noise ratio calculated from the test image may be determined according to the setting of the image sensor 110. Hereinafter, it will be described in greater detail with reference to FIGS. 6A and 6B.

Figure 6A:
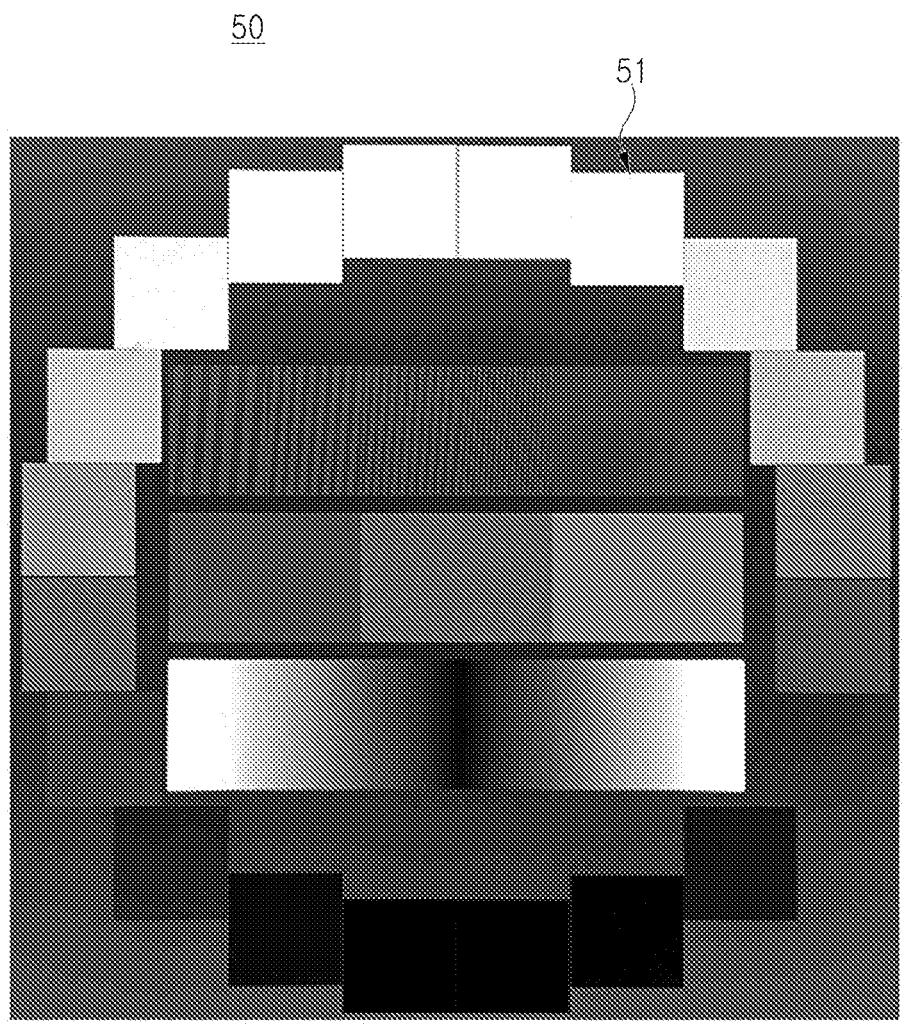
FIGS. 6A and 6B are diagrams illustrating test images obtained by imaging a test chart according to some example embodiments of the present disclosure.
Figure 6B:
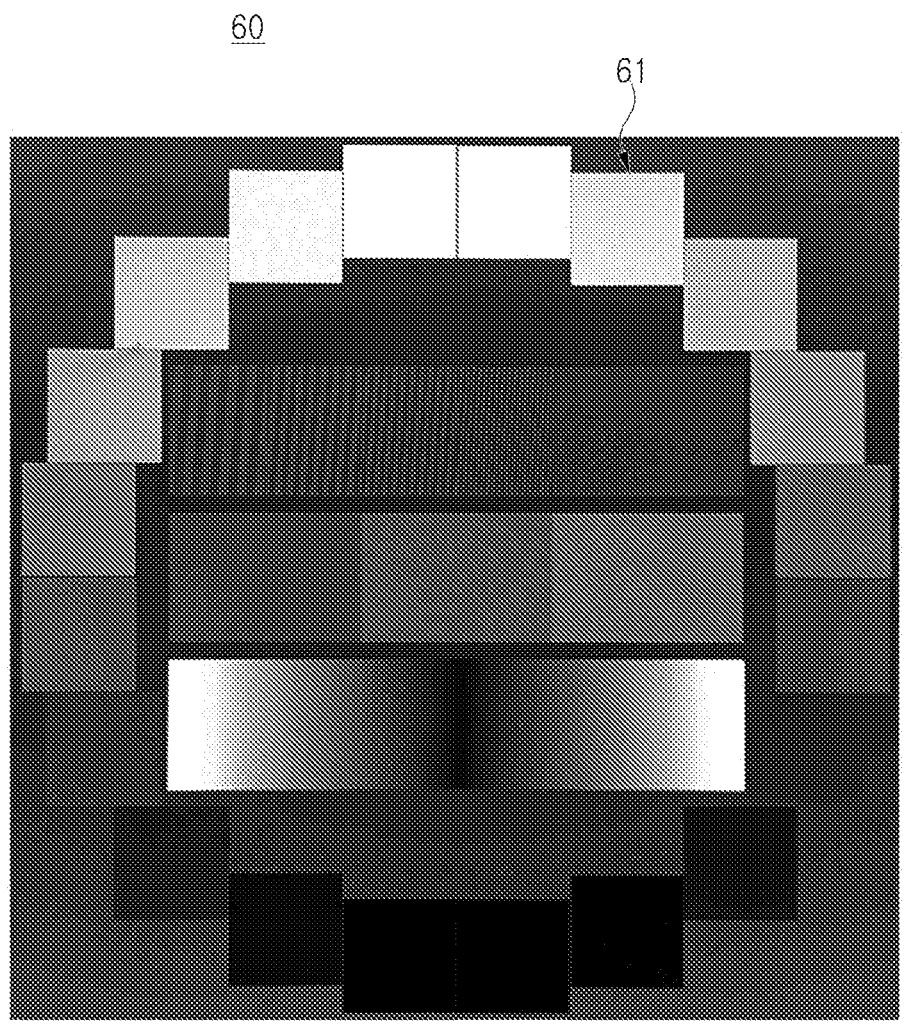

FIGS. 6A and 6B are diagrams illustrating test images obtained by imaging a test chart according to an example embodiment.

FIGS. 6A and 6B may be test images 50 and 60 generated by imaging one test chart. Referring to FIGS. 6A and 6B, evaluation areas 51 and 61 disposed at the edge of the test chart and having different brightness may be displayed on the test images 50 and 60, respectively.

In the test chart according to the comparative example described with reference to FIGS. 6A and 6B, since the evaluation areas 51 and 61 are disposed at the edges, brightness of the evaluation areas 51 and 61 may be different depending on the activation of the LSC function in each of the test images 50 and 60. For example, FIG. 6A may be a test image 50 obtained by imaging the test chart in a state in which the LSC function is activated, and FIG. 6B may be a test image 60 obtained by imaging the test chart in a state in which the LSC function is deactivated.

In other words, in the comparative example, since brightness of the evaluation areas 51 and 61 changes according to the turning on/off of the LSC function in the image sensor, it may be difficult to accurately determine whether the changes in the signal-to-noise ratio according to the brightness displayed in the image is due to the weight provided to the pixel data in the HDR mode or is affected by the LSC function.

Figure 7A:
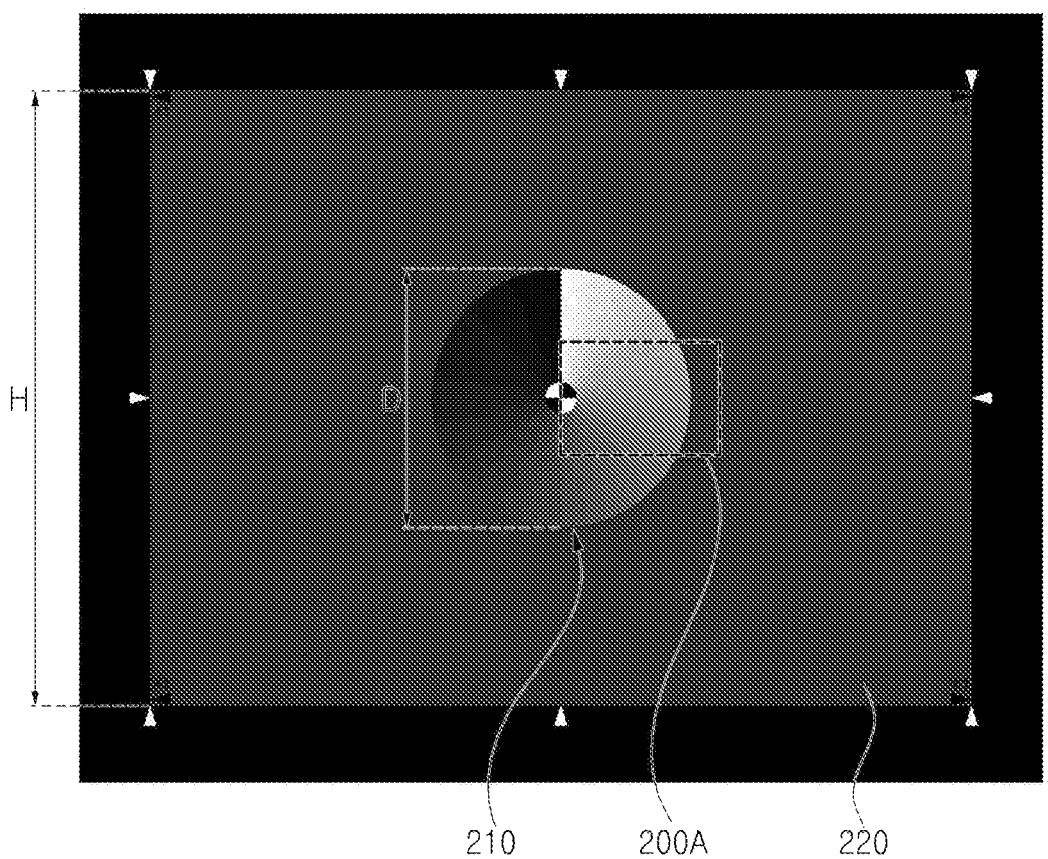
FIGS. 7A and 7B are diagrams illustrating a test chart according to some example embodiments of the present disclosure.
Figure 7B:
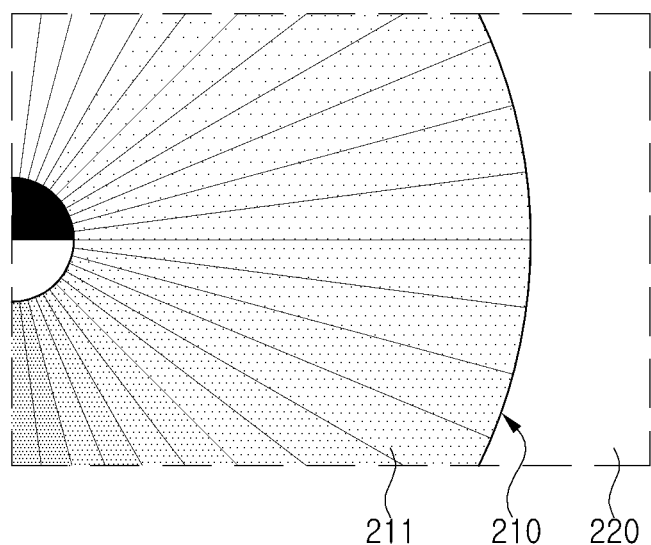

FIGS. 7A and 7B are diagrams illustrating a test chart according to an example embodiment.

Referring to FIG. 7A, a test chart 200 according to an example embodiment may include an evaluation area 210 and a peripheral area 220 surrounding the evaluation area 210. The evaluation area 210 may be disposed in the center of the test chart 200. For example, the center of the evaluation area 210 may be the same as the center of the test chart 200.

In an example embodiment, the evaluation area 210 may have a circular shape, and the diameter D of the evaluation area 210 may be smaller than the width H of the test chart 200. For example, the diameter D of the evaluation area 210 may be smaller than ½ of the width H of the test chart 200. Accordingly, when a test image is generated by imaging the test chart 200 as illustrated in FIG. 7A with an image sensor, the brightness of the evaluation area 210 may be hardly affected by whether the LSC function of the image sensor is activated.

In other words, the brightness of the evaluation area 210 displayed in the test image in which the image sensor imaged the test chart 200 in the state in which the LSC function is activated may be the same as the brightness of the evaluation area 210 displayed in the test image obtained by the image sensor imaging the test chart 200 in a state in which the LSC function is deactivated. Accordingly, by generating test images by imaging the test chart 200 while controlling the on/off of the LSC function, and calculating the signal-to-noise ratio according to changes in brightness in each of the test images, whether an SNR dip occurs at a specific brightness may be accurately evaluated. Also, based on the evaluation result, the weight provided to the pixel data under the high conversion gain condition and the pixel data under the low conversion gain condition in the HDR mode may be adjusted, and the settings of the image sensor may be improved/optimized such that an SNR dip is reduced or does not occur.

Brightness of the evaluation area 200 may be changed in a clockwise or counterclockwise direction with respect to a predetermined reference axis. In the evaluation area 200 according to the example embodiment illustrated in FIG. 7A, a plurality of unit areas having different levels of brightness may be disposed in a clockwise direction, and each of the plurality of unit areas may have a sectoral shape. For example, the number of the plurality of unit areas may be 128. However, this is merely an example, and the number of the plurality of unit areas may be greater than or less than 128.

Referring to FIG. 7B, which is an enlarged diagram of the partial region 200A in FIG. 7A, the plurality of unit areas 211 may be disposed such that the brightness may be darkened in the clockwise direction from the reference axis taken at 12 O'clock. However, this is merely an example embodiment, and the arrangement and shape of the plurality of unit areas 211 and the shape of the evaluation area 200 may vary.

Figure 8:
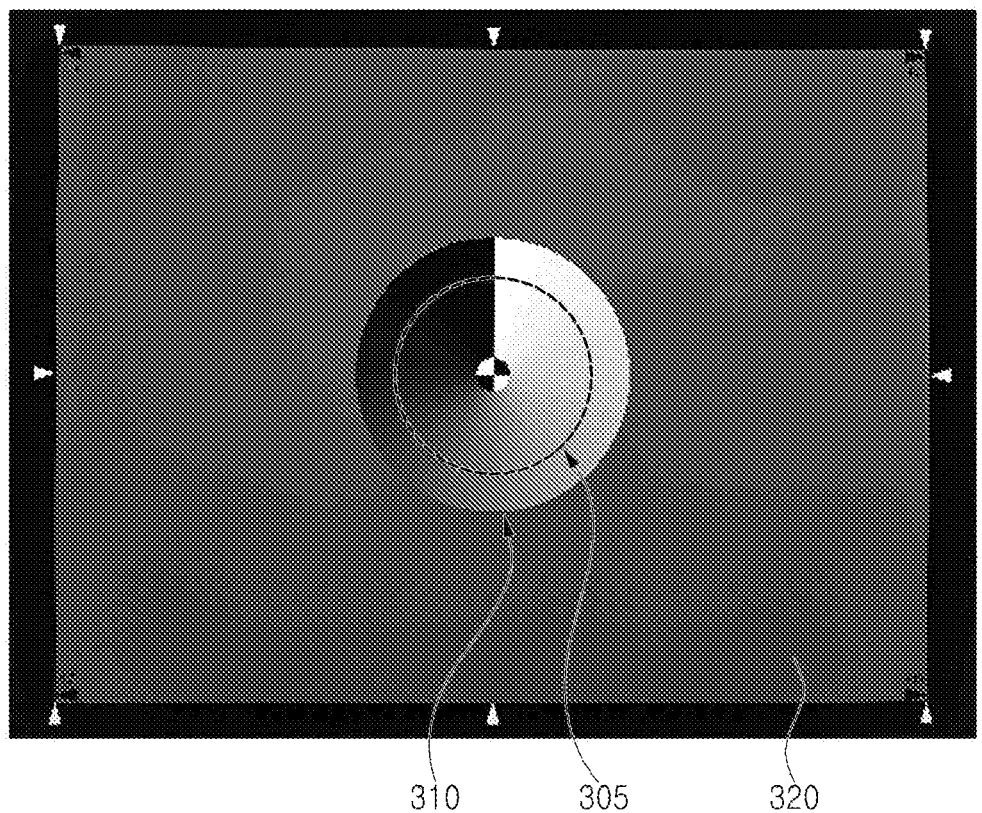
FIGS. 8 and 9 are diagrams illustrating test images obtained by imaging a test chart according to some example embodiments of the present disclosure.
Figure 9:
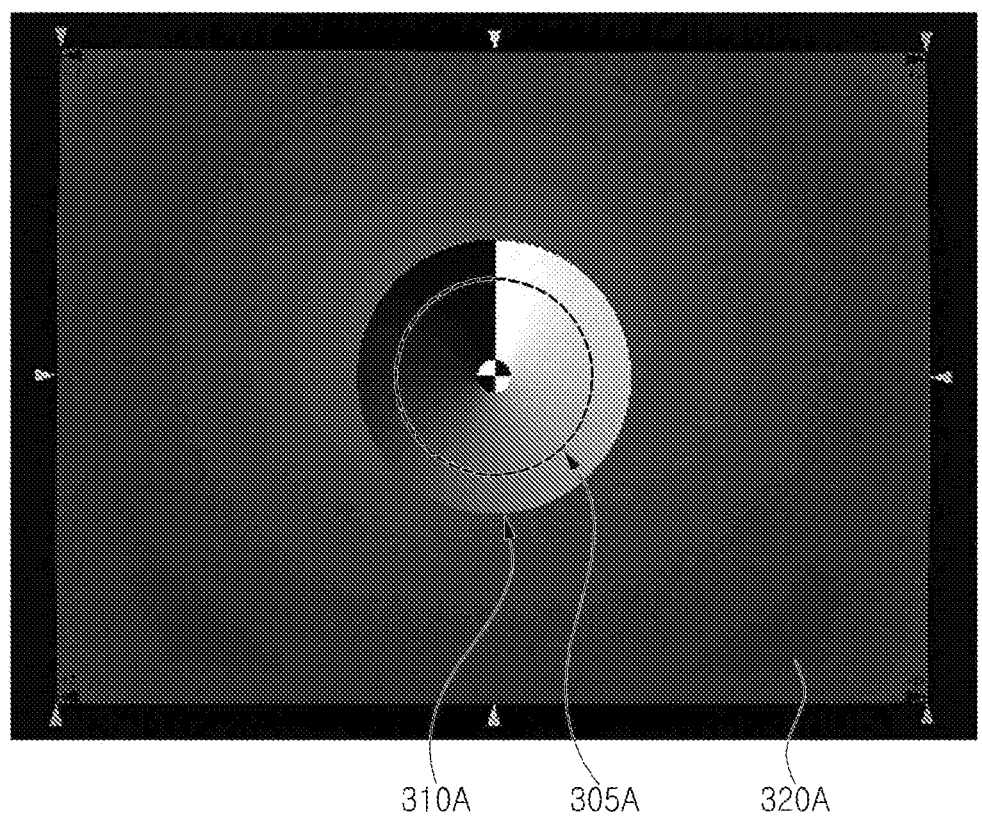

FIGS. 8 and 9 are diagrams illustrating test images obtained by imaging a test chart according to an example embodiment.

FIGS. 8 and 9 are diagrams illustrating test images 300 and 300A that may be generated by imaging a test chart while turning on/off the LSC function of the image sensor. For example, FIG. 8 may be a test image 300 generated by imaging a test chart while the LSC function of the image sensor is activated. FIG. 9 may be a test image 300A generated by imaging a test chart in a state in which the LSC function of the image sensor is deactivated.

Referring to FIGS. 8 and 9, the evaluation area 310 may be displayed in the center of each of the test images 300 and 300A. As described above with reference to FIGS. 7A and 7B, a plurality of unit areas having different levels of brightness and the same area may be disposed in the evaluation areas 310 and 310A. A plurality of unit areas may be disposed such that the evaluation area 310 may have brightness increasing or decreasing in a clockwise or counterclockwise direction.

The evaluation areas 310 and 310A may be disposed in the center of each of the test images 300 and 300A, and may be surrounded by peripheral areas 320 and 320A. Also, the size of the evaluation areas 310 and 310A may be limited as described above with reference to FIG. 7A, and accordingly, whether the LSC function is activated may not significantly affect brightness of the evaluation areas 310 and 310A. Referring to FIGS. 8 and 9, brightness of the evaluation area 310 of the test image 300 generated in a state in which the LSC function is activated, and brightness an evaluation area 310A of the test image 300A generated in a state in which the LSC function is deactivated may not be significantly different and/or may be substantially the same.

However, the brightness of the peripheral areas 320 and 320A may have a difference depending on whether the LSC function is activated. As illustrated in FIGS. 8 and 9, when the LSC function is activated, the brightness of the peripheral area 320 may be higher than that of the peripheral area 320A when the LSC function is deactivated.

As illustrated in FIGS. 8 and 9, when the test images 300 and 300A are obtained, the signal-to-noise ratio of the plurality of unit areas disposed in the evaluation areas 310 and 310A may be calculated. Since the plurality of unit areas have different levels of brightness, changes in the signal-to-noise ratio according to the brightness appearing in the image generated by the image sensor may be evaluated. For example, the signal-to-noise ratio of the plurality of unit areas may be calculated from pixels distributed along circles 305 and 305A defined in positions separated from the center of the evaluation areas 310 and 310A by a predetermined interval as illustrated in FIGS. 8 and 9. When the number of the plurality of unit areas is 128, a signal-to-noise ratio for each of 128 different brightness values may be calculated. Hereinafter, it will be described in greater detail with reference to FIG. 10.

Figure 10:
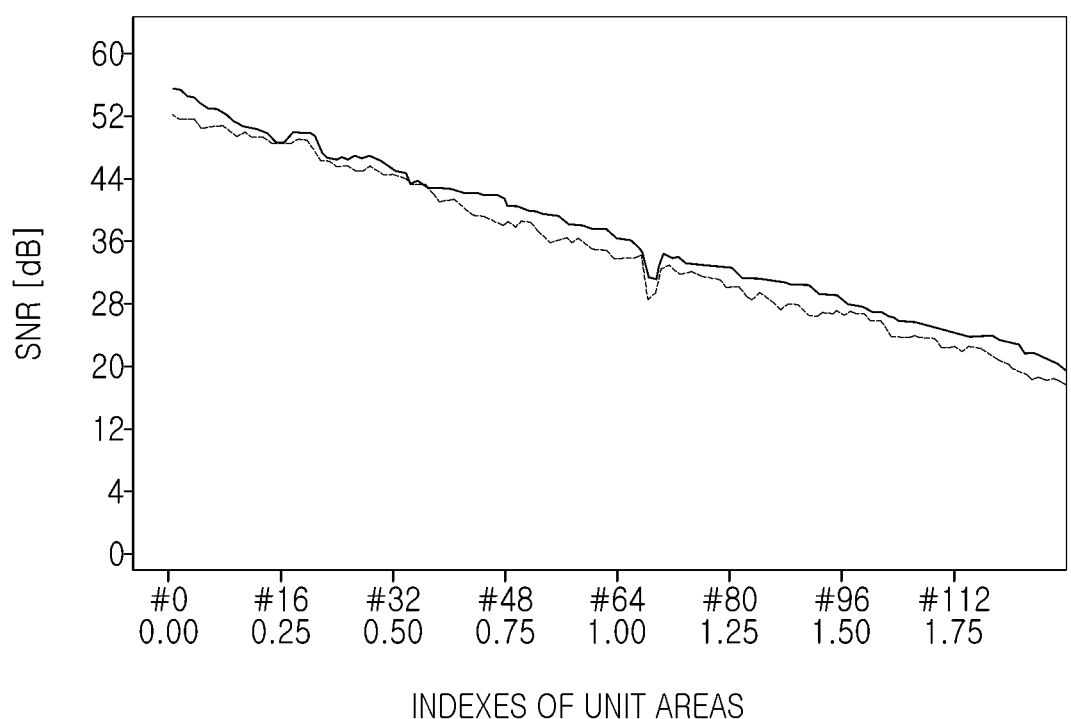
FIG. 10 is a diagram illustrating a method of evaluating performance of an image sensor according to some example embodiments of the present disclosure.

FIG. 10 is a diagram illustrating a method of evaluating performance of an image sensor according to an example embodiment.

The graph in FIG. 10 illustrates signal-to-noise ratios calculated in the evaluation areas 310 and 310A of the test images 300 and 300A described with reference to FIGS. 8 and 9 above according to indexes of the plurality of unit areas included in the evaluation areas 310 and 310A. An index for each of the plurality of unit areas may be assigned in a clockwise direction from a reference axis extending in the 12 o'clock direction in the evaluation areas 310 and 310A.

When the plurality of unit areas includes the first to $n^{th}$ unit areas, index #0 may indicate the first unit area having the highest/brightest brightness. In the example embodiment illustrated in FIG. 10, as the number of the index increases, the brightness of the unit area may become darker (i.e., less bright). For example, the index of the largest number may be assigned to the $n^{th}$ unit area having the lowest/darkest brightness.

In FIG. 10, the first graph G1 corresponds to the example embodiment in FIG. 8 in which the test chart is imaged in a state in which the LSC function is activated, and the second graph G2 corresponds to the example embodiment in FIG. 9 in which the test chart is imaged in a state in which the LSC function is deactivated. Accordingly, the signal-to-noise ratio of each of the plurality of unit areas in the first graph G1 may be slightly greater than the signal-to-noise ratio of each of the plurality of unit areas in the second graph G2.

In an example embodiment, an SNR dip phenomenon in which the signal-to-noise ratio is greatly reduced at a specific brightness may appear. Referring to FIG. 10, the SNR dip phenomenon may appear in the 69th and 70th unit areas disposed in the 69th and $70^{th}$ sectors in the clockwise direction from the 12 o'clock reference axis in the evaluation areas 310 and 310A regardless of whether the LSC function is activated or not. As illustrated in FIG. 10, the signal-to-noise ratio calculated in each of the 69th and 70th unit areas may have a relatively small value as compared to the adjacent 68th and 71st unit areas.

The signal-to-noise ratio may follow a tendency to gradually decrease according to the brightness. Whether the SNR dip occurs in a performance evaluation method according to an example embodiment may be determined according to whether the signal-to-noise ratio decreases to an extent deviating from the decreasing of the signal-to-noise ratio due to the decrease in brightness in a unit area of a specific brightness and increases again. For example, when the signal-to-noise ratio sharply decreases by 3 dB or more, it may be determined that an SNR dip has occurred at the corresponding brightness.

In an example embodiment, the evaluation area may be disposed in the center of the test chart and the size thereof may be limited such that the influence depending on whether the LSC function is activated or not may be reduced. Accordingly, as illustrated in FIG. 10, the tendency of the signal-to-noise ratio according to changes in brightness may be similarly measured in the test images 300 and 300A regardless of whether the LSC function is activated or not, and the SNR dip phenomenon may also appear in the same unit area.

Accordingly, in an example embodiment, it may be determined that the cause of the SNR dip phenomenon in the unit area of a specific brightness may be due to the DCG setting which may be activated by the image sensor operating in HDR mode to implement the corresponding brightness in the test images 300 and 300A. The controller controlling the image sensor for performance evaluation may change weights provided to pixel data obtained under different conversion gain conditions in the DCG setting for the brightness at which the SNR dip phenomenon has occurred. Accordingly, the SNR dip phenomenon may be addressed and/or performance of the image sensor may be improved/optimized.

Figure 11:
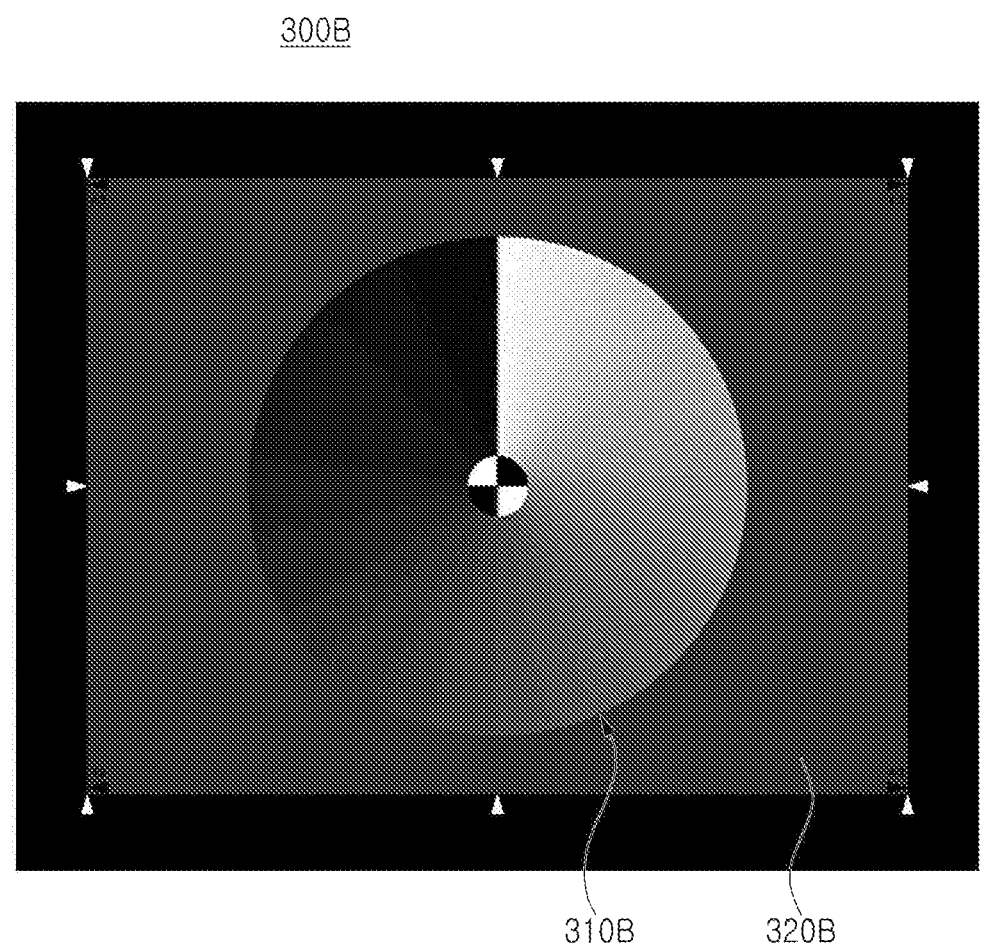
FIG. 11 is a diagram illustrating a test chart according to some example embodiments of the present disclosure.

FIGS. 12A to 12D are diagrams illustrating a method of evaluating performance of an image sensor using test image 300B of FIG. 11 including evaluation area 310B and peripheral area 320B according to an example embodiment.

More particularly, FIGS. 12A to 12D are diagrams illustrating signal-to-noise ratios for a plurality of unit areas included in an evaluation area 310B in each of the test images 300B in which test images may be obtained by imaging the test chart of FIG. 11. In each in FIGS. 12A to 12D, a signal-to-noise ratio for each of brightness Y, red color R, green color G, and blue color B may be represented as a graph.

FIGS. 12A to 12D may represent signal-to-noise ratios calculated from test images obtained by imaging a test chart while changing settings in an image sensor. For example, when the image sensor operates in the HDR mode, DCG settings including a ratio between weights applied to pixel data obtained under different conversion gain conditions may be determined differently in FIGS. 12A to 12D.

Figure 12A:
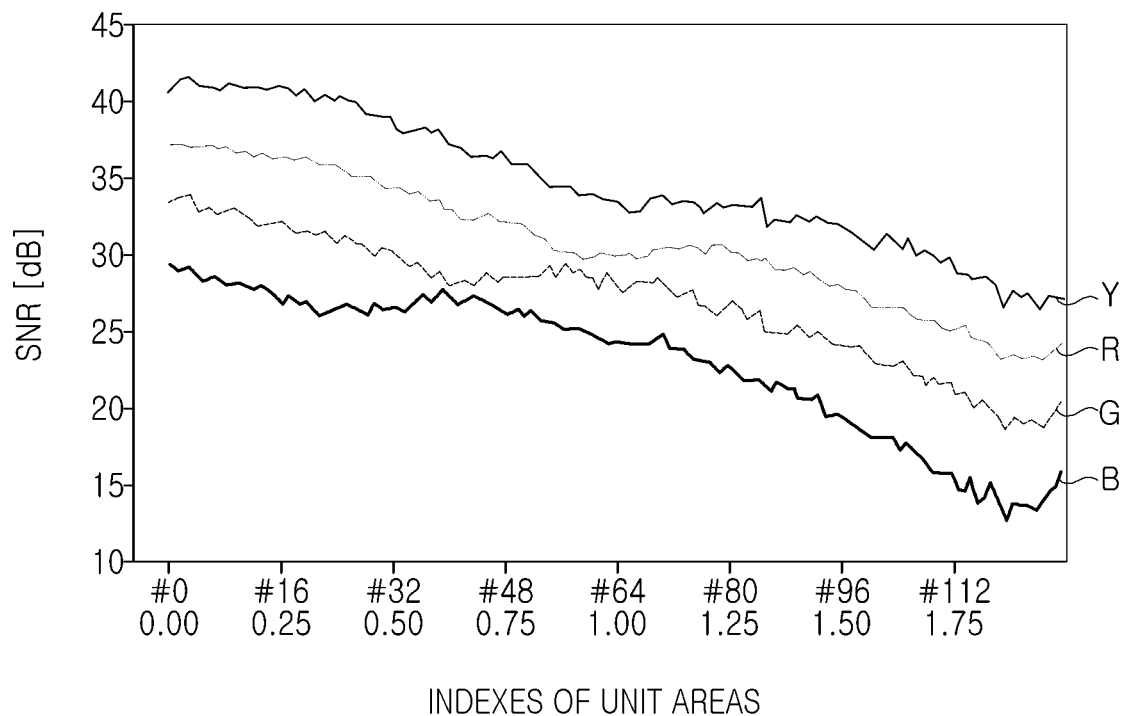
FIGS. 12A to 12D are diagrams illustrating methods of evaluating performance of an image sensor according to some example embodiments of the present disclosure.
Figure 12B:
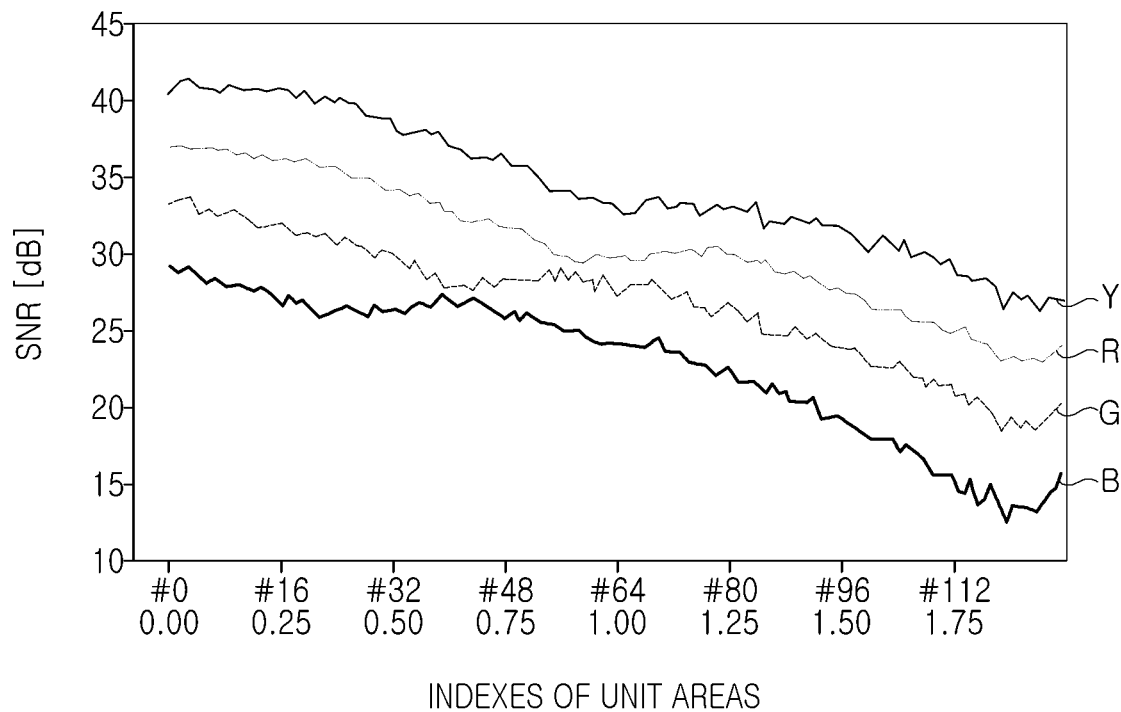
Figure 12C:
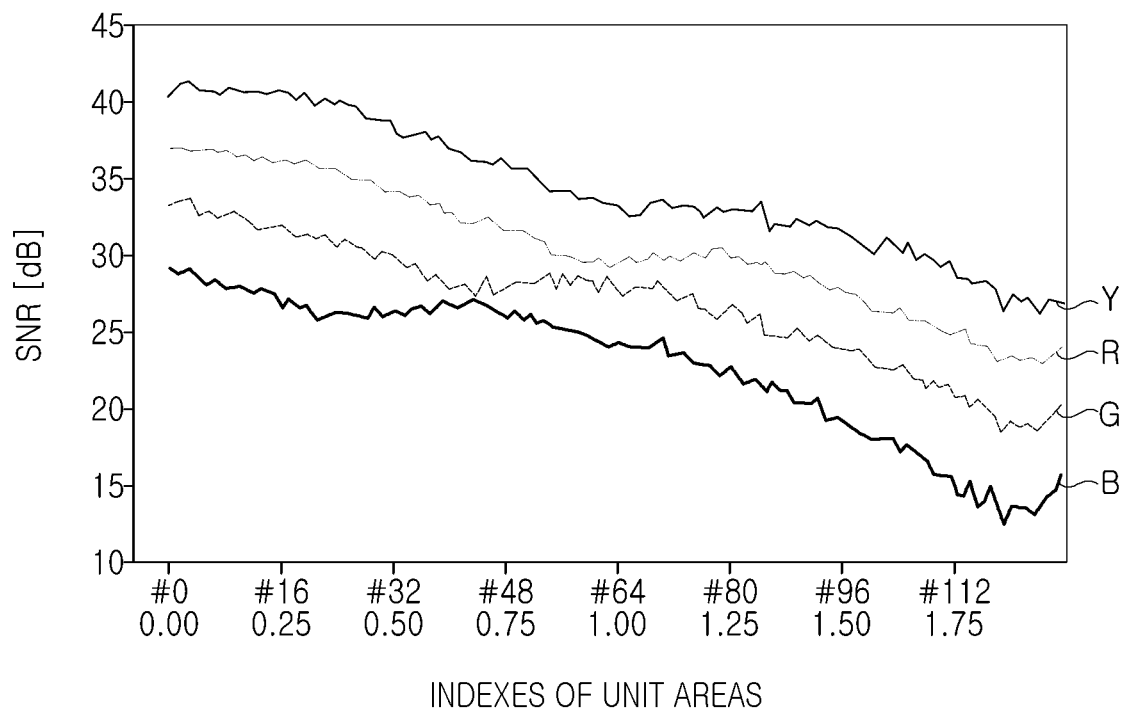
Figure 12D:
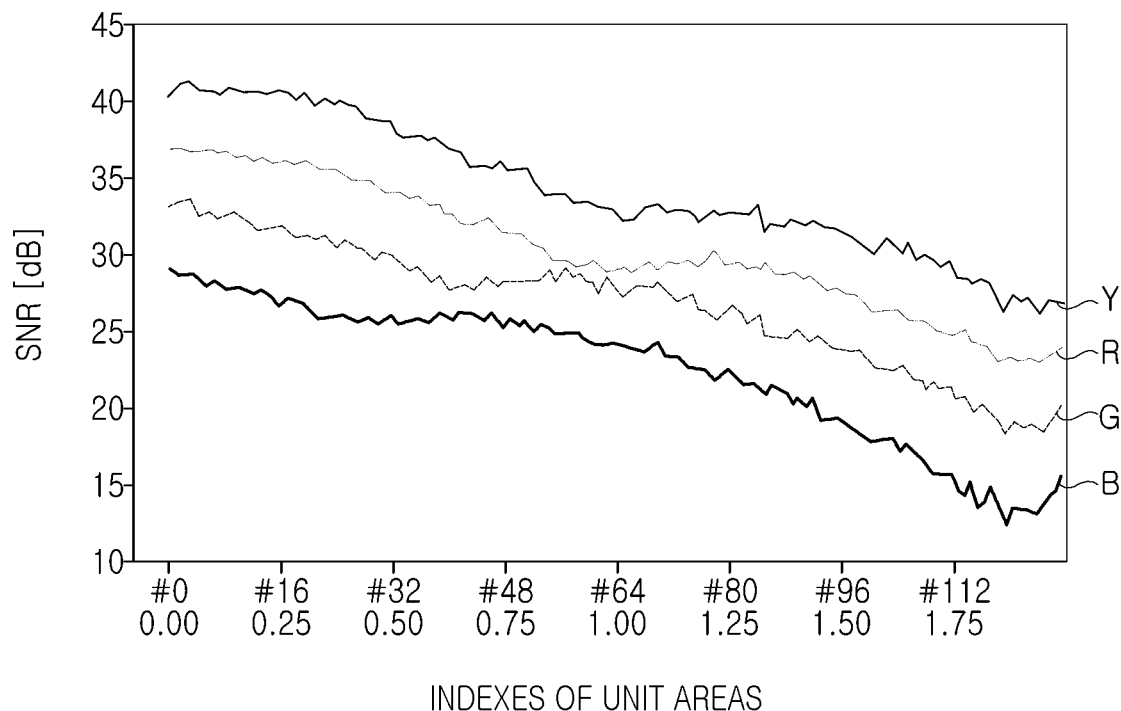

As illustrated in FIGS. 12A to 12D, in an example embodiment, test images may be generated while changing the DCG setting of the image sensor, and the image sensor settings may be set to improve/optimize performance of the image sensor based thereon. For example, when the signal-to-noise ratio graphs illustrated in FIGS. 12A to 12D are generated, it may be determined that performance of the image sensor may be the best in the DCG setting corresponding to FIG. 12D. Referring to FIG. 12D, differently from the example embodiments in FIGS. 12A to 12C, a tendency of the signal-to-noise ratio of blue color B to increase in unit areas of a specific index, that is, for example, 35th to 40th unit areas, may appear the smallest.

Along with the signal-to-noise ratio of each of the plurality of unit areas displayed in the evaluation area in the test image, the average level code may be obtained from the plurality of unit areas of the test image, and performance of the image sensor may be determined, evaluated and improved/optimized therefrom, which will be described in greater detail below.

FIGS. 13, 14A, 14B, 15, 16A, and 16B are diagrams illustrating a method for evaluating performance and improving/optimizing settings of an image sensor according to an example embodiment.

Figure 13:
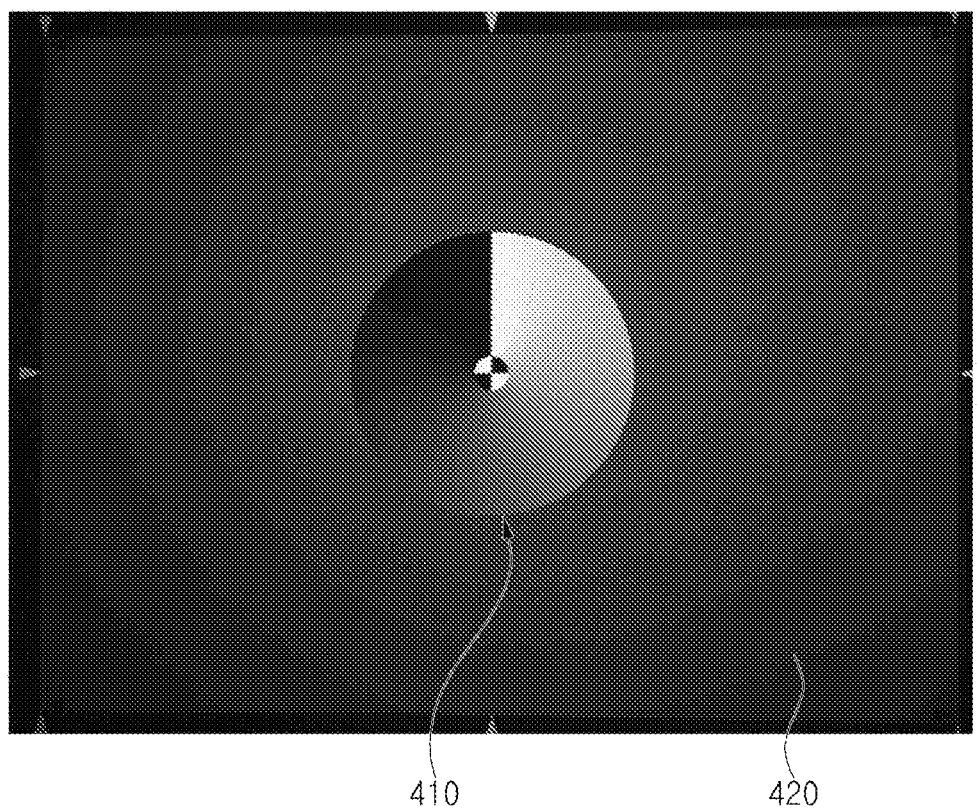
FIGS. 13, 14A, 14B, 15, 16A, and 16B are diagrams illustrating methods of evaluating performance of an image sensor and methods of improving/optimizing settings of an image sensor according to some example embodiments of the present disclosure.
Figure 15:
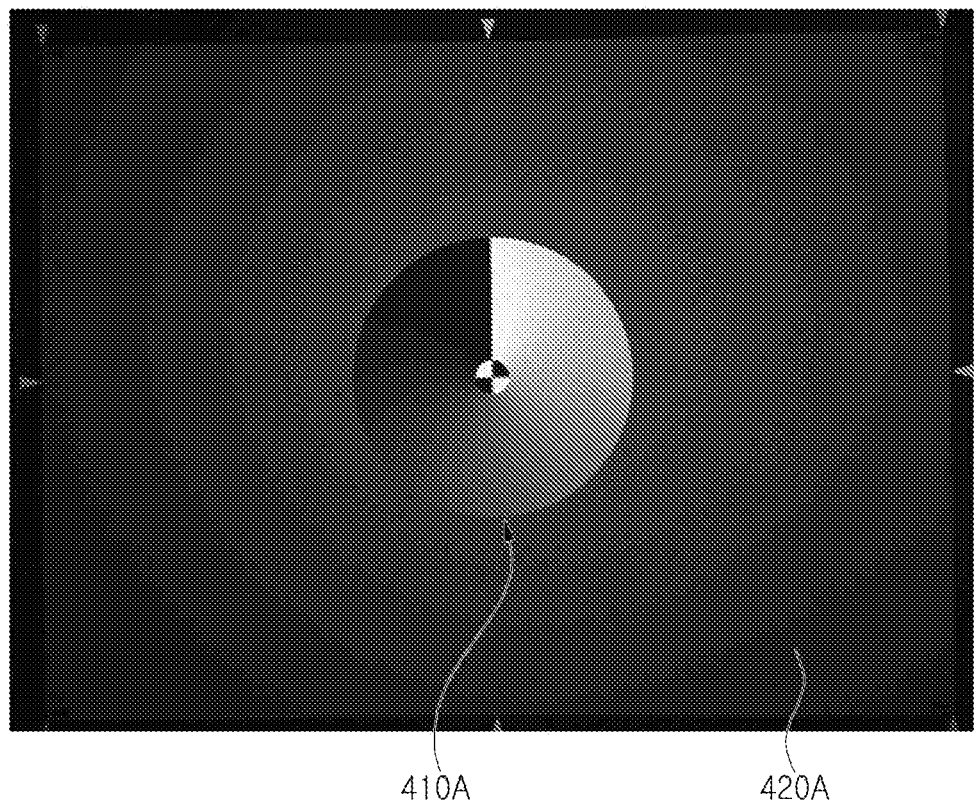

FIG. 13 may be a test image 400 obtained by imaging a test chart after adjusting the settings of the image sensor to the first settings. Referring to FIG. 13, the first test image 400 may include a first evaluation area 410 in which a plurality of unit areas are displayed, and a first peripheral area 420. FIG. 15 may be a second test image 400A obtained by imaging a test chart after setting the image sensor to a second setting different from the first setting. Referring to FIG. 15, the second test image 400A may include a second evaluation area 410A in which a plurality of unit areas are displayed, and a second peripheral area 420A.

The setting in which the first setting and the second setting are applied in the image sensor when generating each of the first test image 400 and the second test image 400A may be, for example, a DCG setting required for HDR mode operation. Accordingly, values of weights applied to pixel data obtained under different conversion gain conditions in the first setting may be different from values of weights applied to pixel data obtained under different conversion gain conditions in the second setting.

Figure 14A:
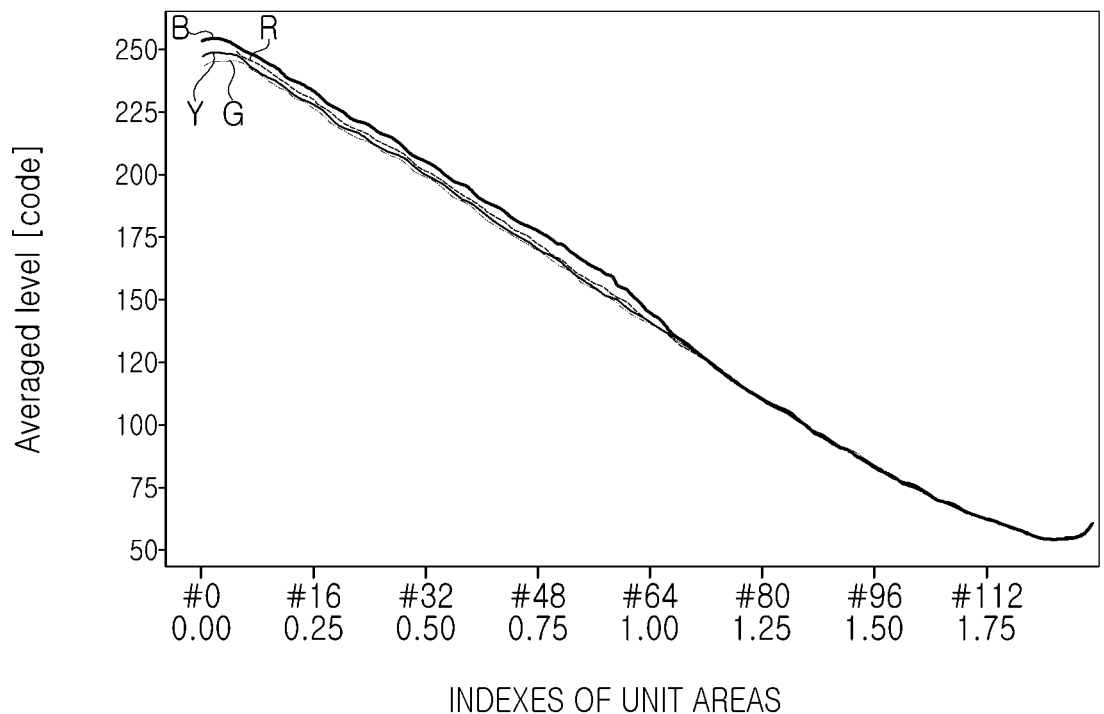

FIG. 14A may be a graph illustrating an average level code calculated in each of a plurality of unit areas displayed in the first test image 400. For example, the first test image 400 according to the example embodiment illustrated in FIG. 13 may be an 8-bit image, and accordingly, brightness Y, red color R, green color G, and blue color B of each pixel may be represented by one of 256 codes. The plurality of unit areas may have brighter brightness as the index number is smaller, and the plurality of unit areas may have a darker brightness as the index number is larger. Accordingly, as illustrated in FIG. 14A, as the index number increases, the average level codes of brightness Y, red color R, green color G, and blue color B of each of the plurality of unit areas may decrease.

Figure 14B:

FIG. 14B may be a graph illustrating a signal-to-noise ratio calculated in each of a plurality of unit areas displayed in the first test image 400. The signal-to-noise ratio of each of brightness Y, red color R, green color G, and blue color B may have a tendency to gradually decrease in response to the decrease in brightness of a plurality of unit areas according to an increase in the index number. However, as illustrated in FIG. 14B, in a specific unit area, that is, for example, the 67th and 68th unit areas, an SNR dip phenomenon in which the signal-to-noise ratio of blue color B is greatly reduced may occur.

Figure 16A:
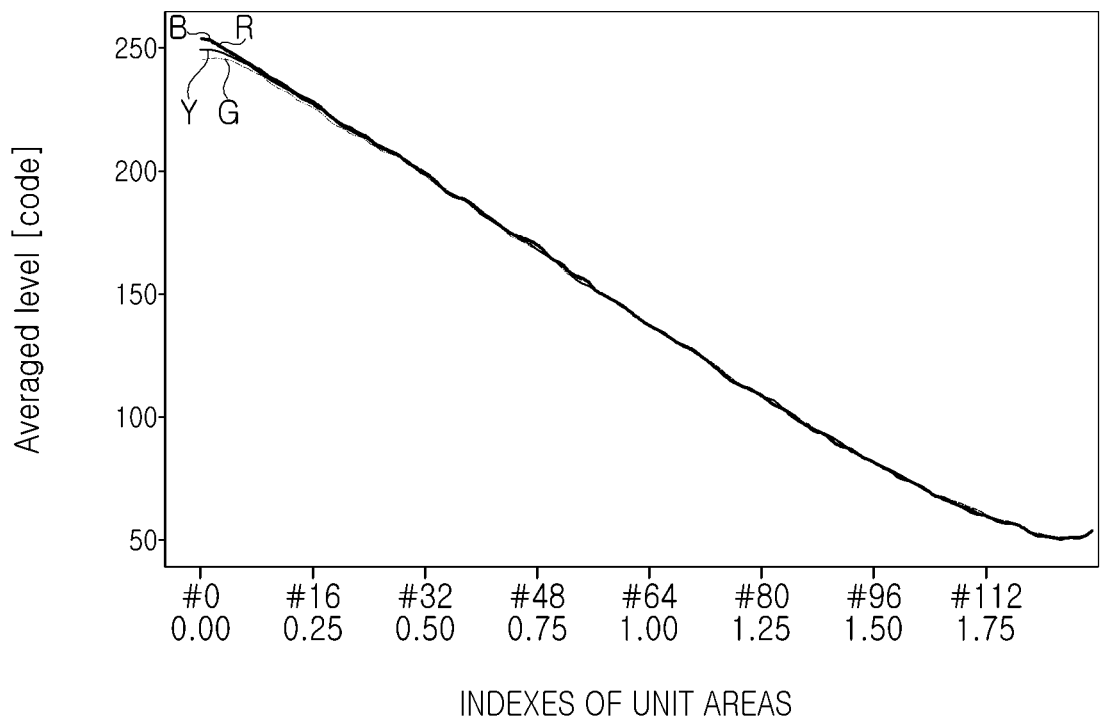

FIG. 16A may be a graph illustrating an average level code calculated in each of a plurality of unit areas displayed in the second test image 400A. For example, similarly to the first test image 400, the second test image 400A may also be an 8-bit image, and brightness Y, red color R, green color G, and blue color B of each pixel may be represented by one of 256 levels of codes. As illustrated in FIG. 16A, as the index number increases, the average level code of brightness Y, red color R, green color G, and blue color B of each of the plurality of unit areas may decrease.

Comparing the graph illustrated in FIG. 14A with the graph illustrated in FIG. 16A, the average level code of each of brightness Y, red color R, green color G, and blue color B may have more similar values in the graph illustrated in FIG. 16A. In other words, the difference between the average level codes of brightness Y, red color R, green color G, and blue color B in each of the plurality of unit areas may appear smaller in the second test image 400A.

Figure 16B:
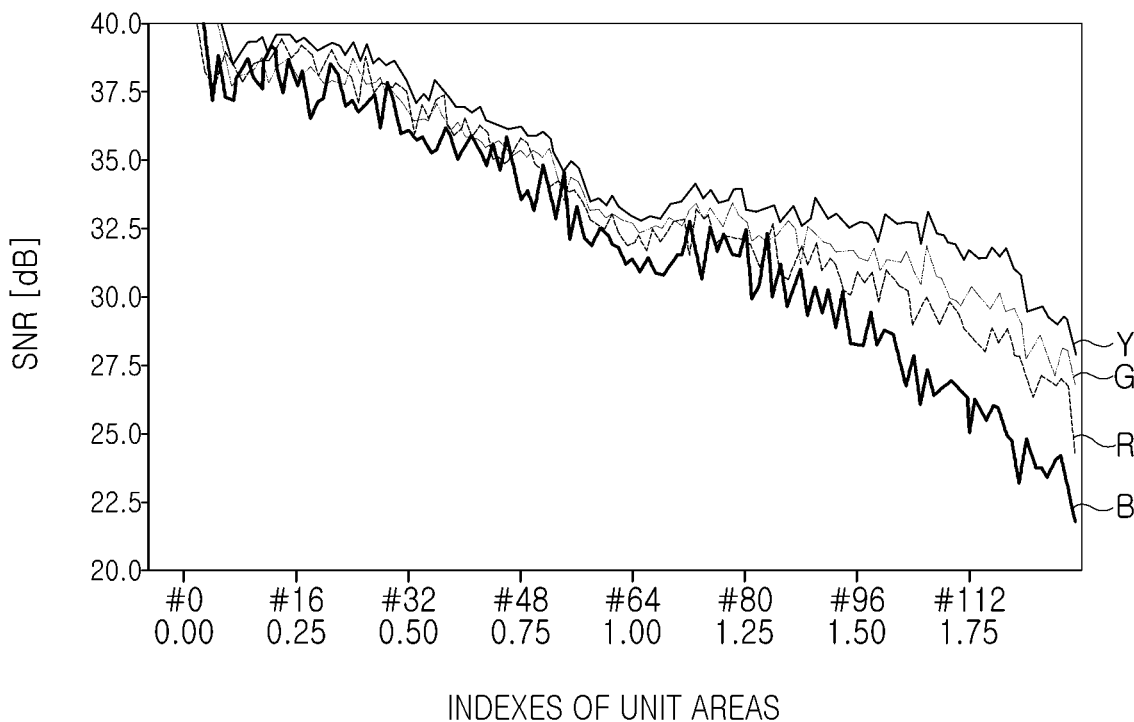

FIG. 16B is a graph illustrating a signal-to-noise ratio calculated in each of a plurality of unit areas displayed in the second test image 400A. The signal-to-noise ratio of each of brightness Y, red color R, green color G, and blue color B may have a tendency to gradually decrease as the brightness of the plurality of unit areas decreases. Also, as illustrated in FIG. 16B, in the second test image 400A, the SNR dip phenomenon in which the signal-to-noise ratio of brightness Y, red color R, green color G, and blue color B greatly decrease in a specific unit region may not appear. Accordingly, when the second setting is applied to the image sensor as when generating the second test image 400A, it may be determined that performance of the image sensor may improve as compared to the example in which the first setting is applied to the image sensor as when generating the first test image 400.

Figure 17A:
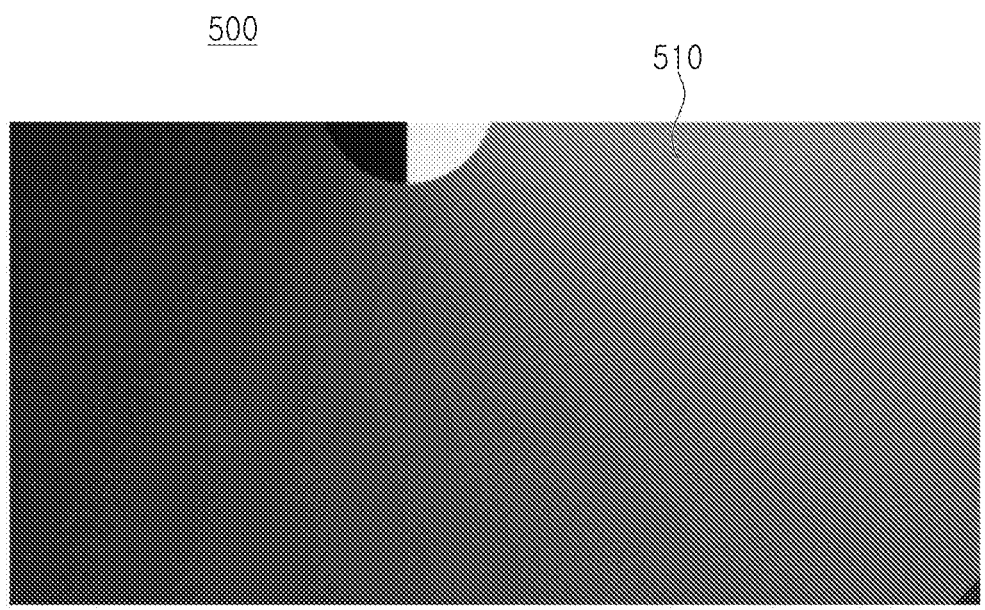
FIGS. 17A, 17B, 18A, and 18B are diagrams illustrating methods of evaluating performance of an image sensor and methods of improving/optimizing settings of an image sensor according to some example embodiments of the present disclosure.
Figure 17B:
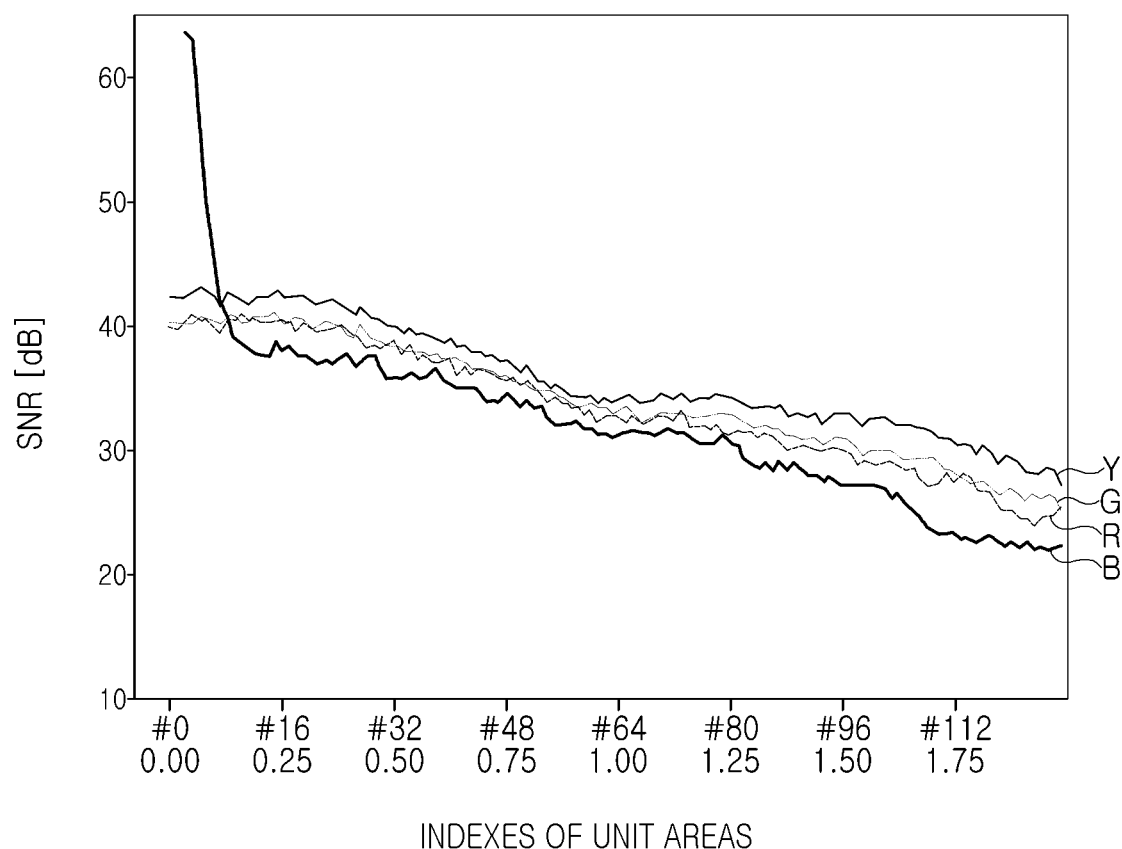
Figure 18A:
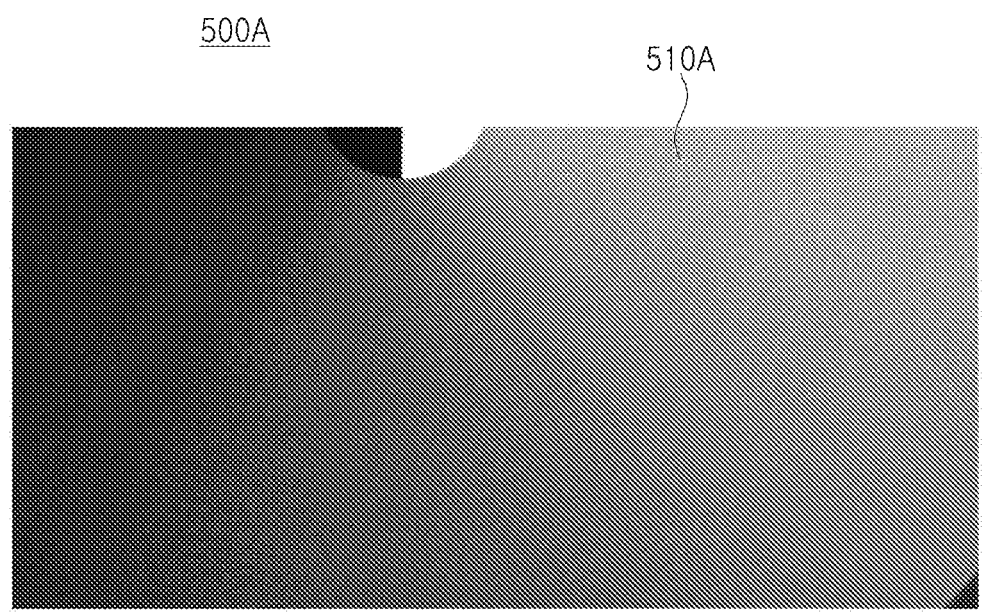

FIGS. 17A, 17B, 18A, and 18B are diagrams illustrating a method of evaluating performance of an image sensor and a method of improving/optimizing settings of an image sensor according to an example embodiment FIGS. 17A and 18A are test images 500 and 500A obtained by changing the DCG setting required for the HDR mode operation of the image sensor. For example, to display a unit area having intermediate brightness among unit areas included in the evaluation areas 510 and 510A, in the first test image 500, weights of the first ratio may be applied to pixel data obtained under a low conversion gain condition and pixel data obtained under a high conversion gain condition. In the second test image 500A, to display a unit area having the same brightness as the intermediate brightness, a weight of the second ratio may be applied to the pixel data obtained under the low conversion gain condition and the pixel data obtained under the high conversion gain condition.

Figure 18B:
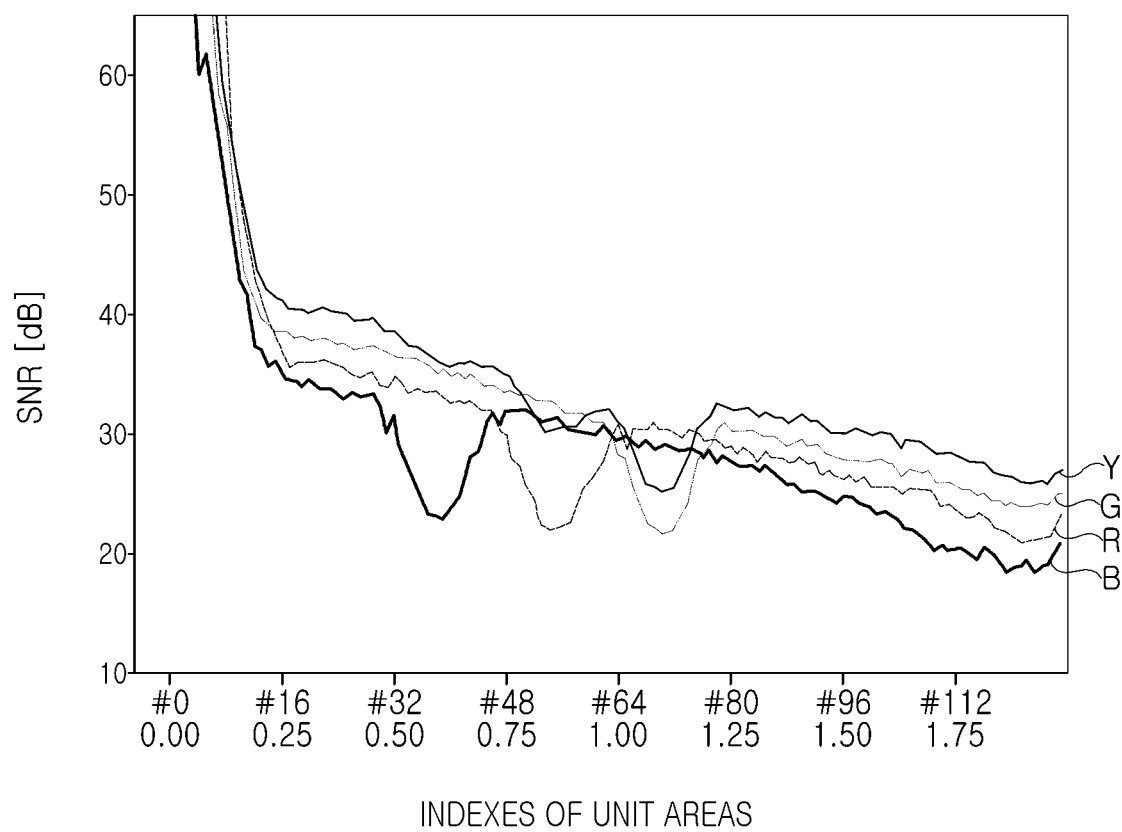
Figure 19A:
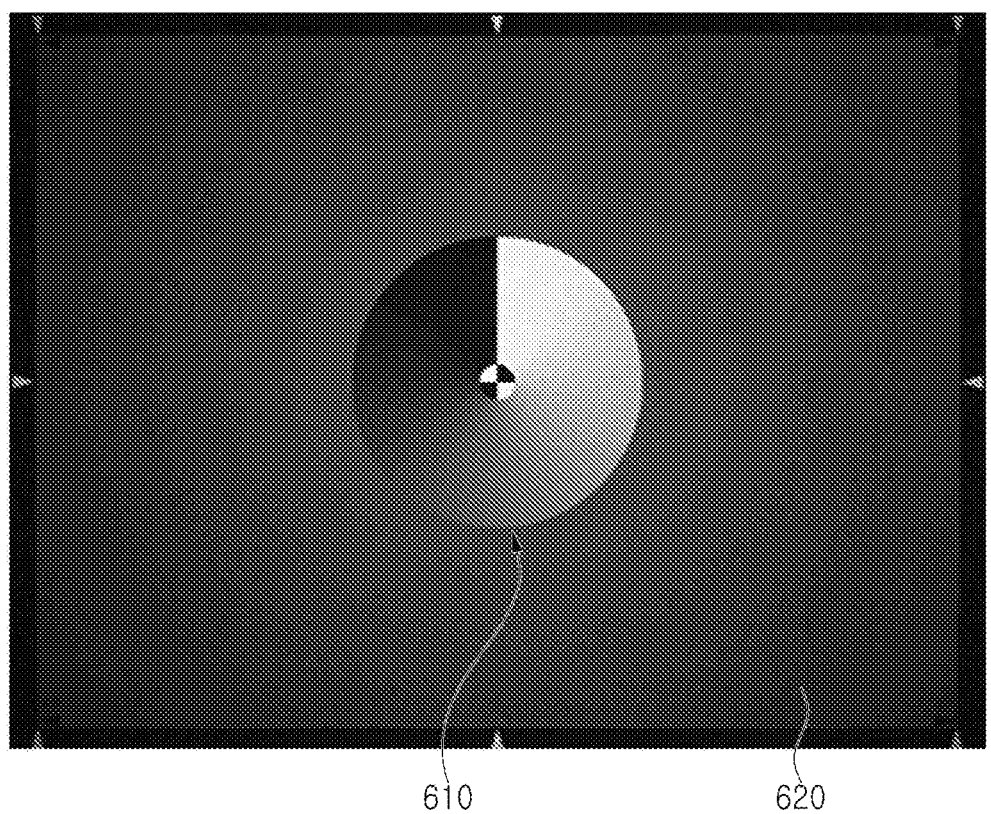
FIGS. 19A to 19E are diagrams illustrating test images obtained by imaging a test chart according to some example embodiments of the present disclosure.
Figure 19B:
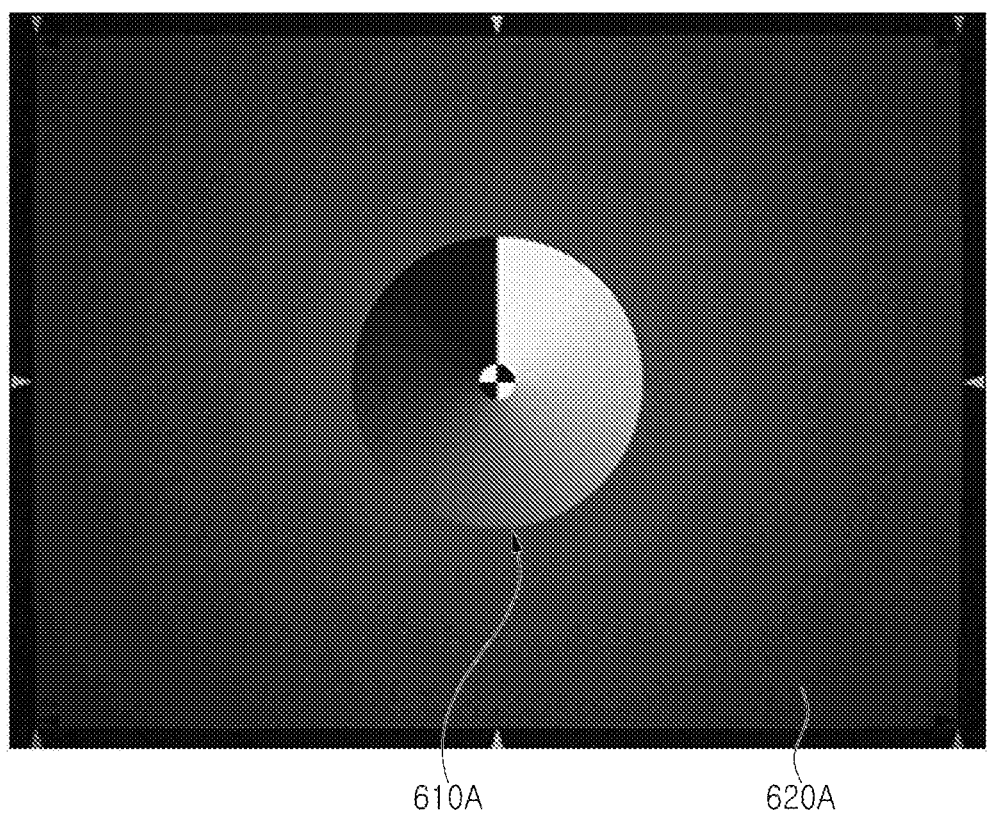
Figure 19C:
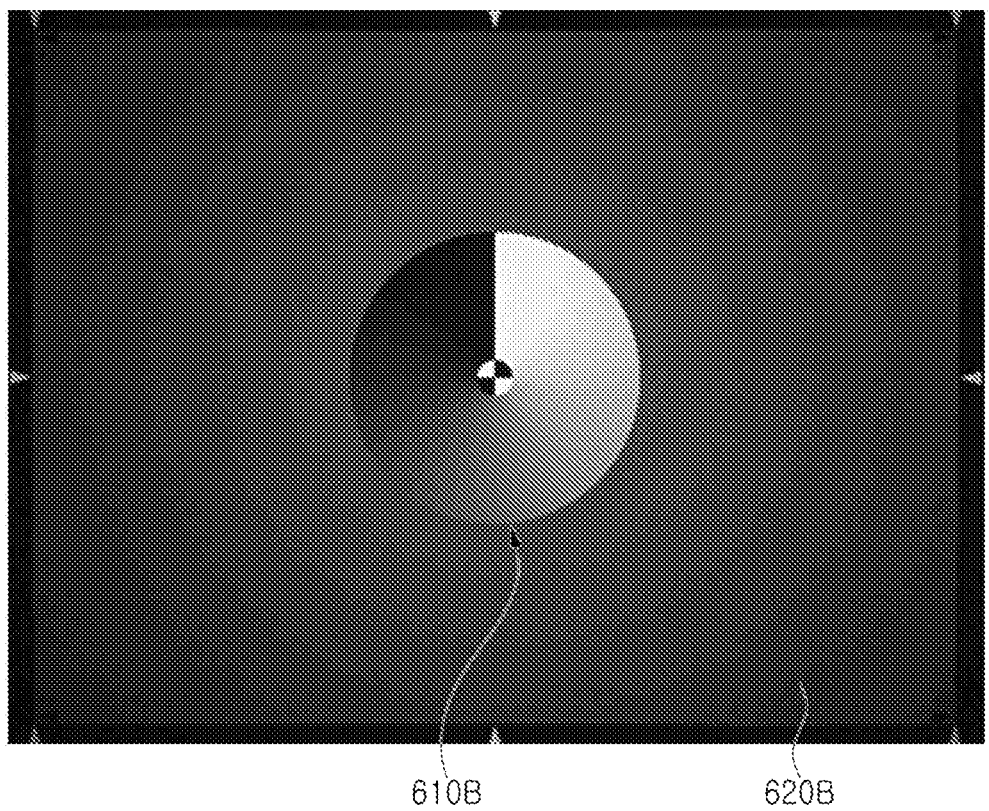
Figure 19D:
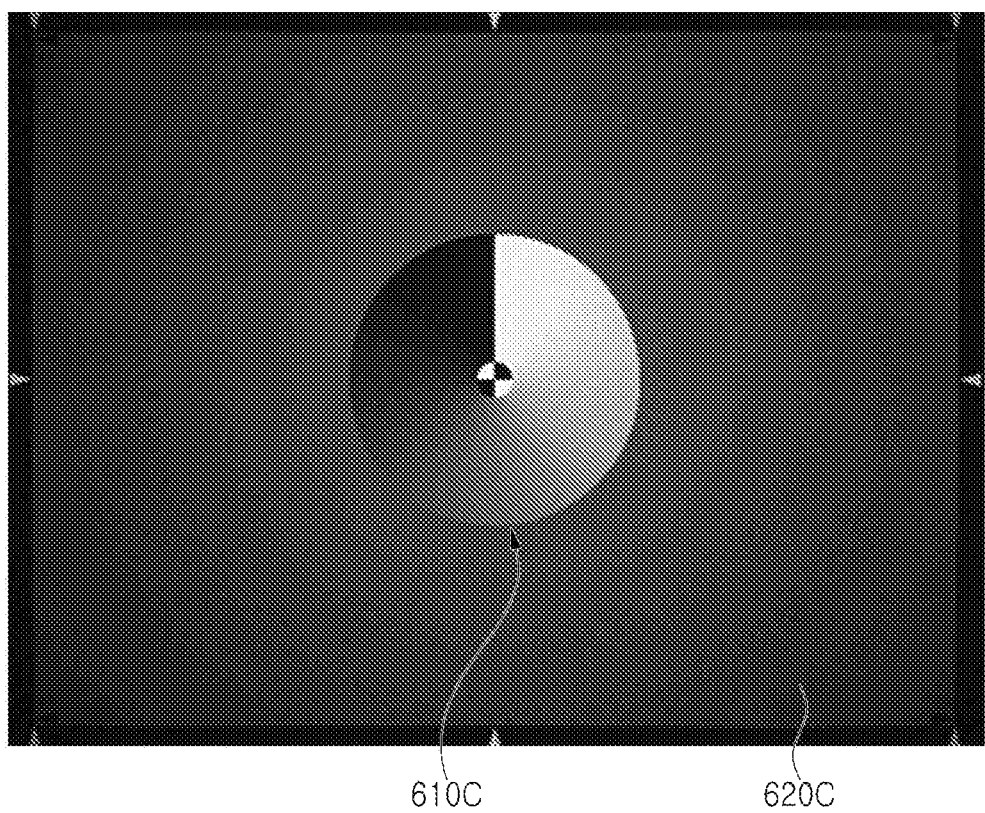
Figure 19E:
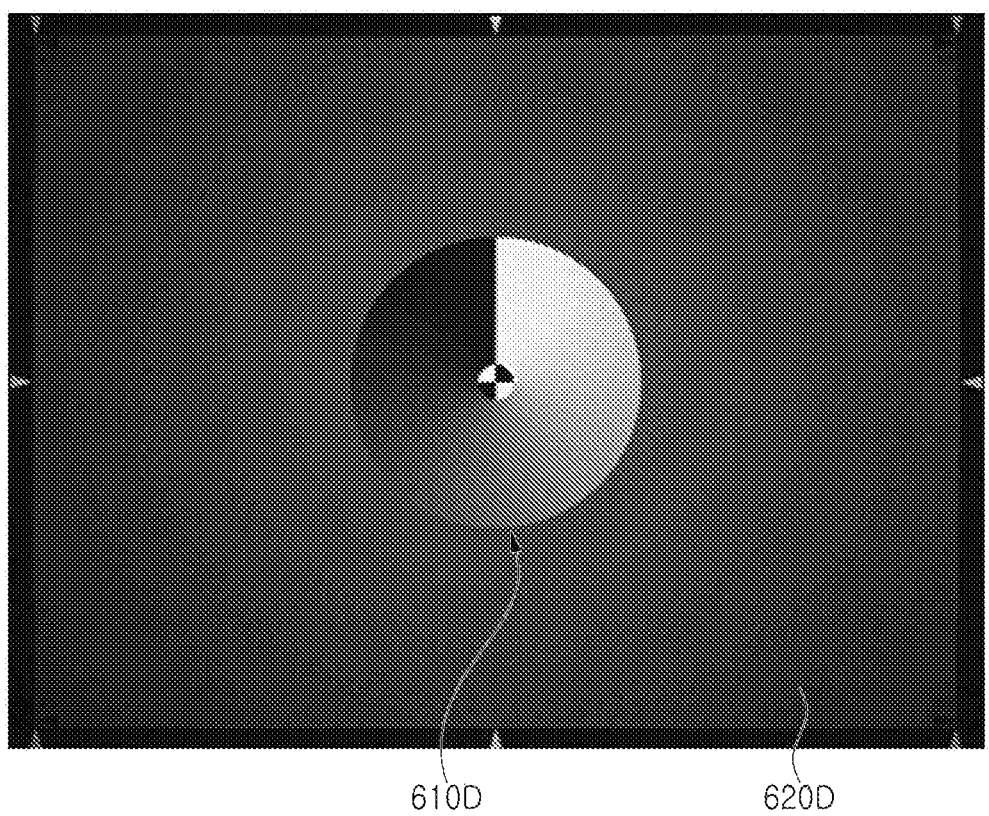

FIGS. 17B and 18B illustrate graphs generated by calculating a signal-to-noise ratio for each of a plurality of unit areas in the test images 500 and 500A for brightness Y, red color R, green color G, and blue color B. Referring to FIG. 17B, the controller receiving the first test image 500 for evaluation of performance of the image sensor may determine whether the SNR dip occurred in the signal-to-noise ratio of brightness Y calculated from the 60th to 63rd unit areas.

The controller may calculate a first SNR difference $\Delta SNR1$ corresponding to a change in the signal-to-noise ratio in brightness Y of the 60th to 63rd unit areas. For example, in FIG. 17B, the first SNR difference $\Delta SNR1$ may be about 1 dB. When the first SNR difference ($\Delta SNR1$) is equal to or greater than a predetermined threshold difference, the controller may determine that an SNR dip has occurred. For example, the threshold difference may be determined to be 3 dB. Accordingly, in the example embodiment illustrated in FIG. 17B, the controller may determine that the SNR dip phenomenon has not occurred.

Referring to FIG. 18B, the controller receiving the second test image 500A for evaluation of performance of the image sensor may determine whether an SNR dip phenomenon has occurred at the signal-to-noise ratio of brightness Y calculated from the 65th to 70th unit areas. The controller may calculate a second SNR difference $\Delta SNR2$ corresponding to a change in a signal-to-noise ratio in blue color B of the 65th to 70th unit areas, and may compare the difference with a threshold difference. In the example embodiment illustrated in FIG. 18B, the second SNR difference ($\Delta SNR2$) may be about 5.8 dB, and accordingly, the controller may determine that the SNR dip phenomenon has occurred in the second test image 500A.

Also, as illustrated in FIG. 18B, in the second test image 500A, the SNR dip phenomenon in which the signal-to-noise ratio decreases by more than the threshold difference between red color R, green color G, and blue color B calculated in some unit areas. Accordingly, the controller may determine that performance of the image sensor according to the setting when generating the first test image 500 may be better than performance of the image sensor according to the setting when generating the second test image 500A.

As described above, as the settings of the image sensor are changed, the signal-to-noise ratio according to each color may be deteriorated in a portion of the unit areas. In an example embodiment, a ratio between the signal-to-noise ratios of red color R and green color G and a ratio between the signal-to-noise ratios of blue color B and green color G may be calculated for each of the plurality of unit areas, performance of the image sensor may be accurately evaluated and the settings may be improved/optimized, which will be described in greater detail below.

Figure 20A:
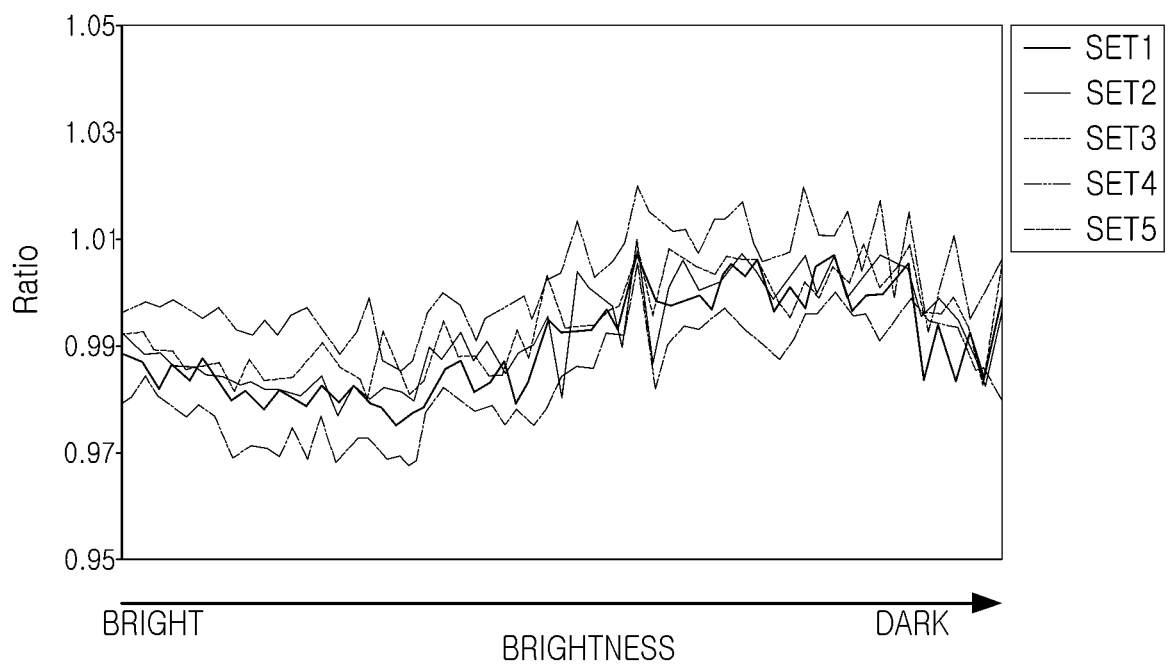
FIGS. 20A and 20B are diagrams illustrating methods of evaluating performance of an image sensor and methods of improving/optimizing settings of an image sensor according to some example embodiments of the present disclosure.
Figure 20B:
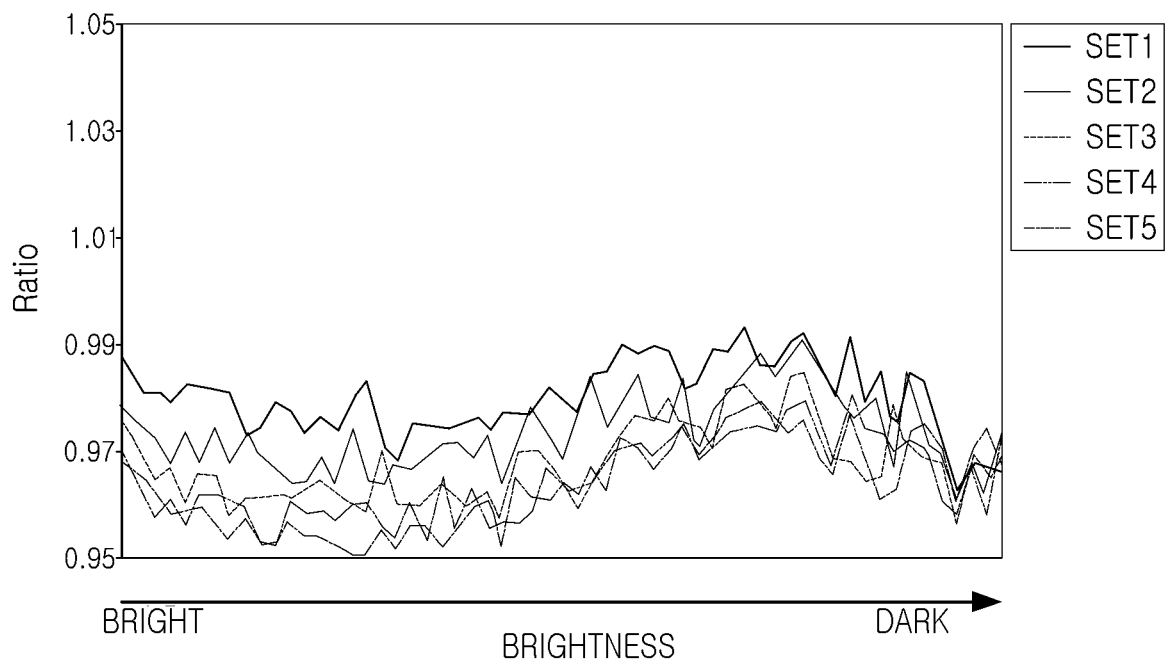

FIGS. 19A to 19E are diagrams illustrating test images obtained by imaging a test chart according to an example embodiment. FIGS. 20A and 20B are diagrams illustrating a method of evaluating performance of an image sensor and a method of improving/optimizing settings of an image sensor according to an example embodiment.

FIGS. 19A to 19E may be diagrams illustrating test images 600, 600A, 600B, 600C, and 600D obtained by imaging a test chart while changing settings of an image sensor. Referring to FIGS. 19A to 19E, colors of the evaluation areas 610, 610A, 610B, 610C, and 610D displayed in the test images 600, 600A, 600B, 600C, and 600D and the surrounding regions 620, 620A, 620B, 620C, and 620D may be varied as the settings of the image sensor are changed.

In an example embodiment, the controller changing the setting of the image sensor for performance evaluation and receiving the test images 600, 600A, 600B, 600C, and 600D from the image sensor may calculate a signal-to-noise ratio for each color according to changes in brightness in the evaluation areas 610, 610A, 610B, 610C, and 610D. FIG. 20A illustrates a ratio between a signal-to-noise ratio of a red color and a signal-to-noise ratio of a green color according to changes in brightness in each of the evaluation areas 610, 610A, 610B, 610C, and 610D. FIG. 20B illustrates a ratio between a signal-to-noise ratio of a blue color and a signal-to-noise ratio of a green color according to a change in brightness in each of the evaluation areas 610, 610A, 610B, 610C, and 610D.

For example, as the ratio of the signal-to-noise ratio of the red color to the signal-to-noise ratio of the green color and the ratio of the signal-to-noise ratio of the blue color to the signal-to-noise ratio of the green color are more approximate to 1.0, it may be determined that the image sensor performance may be improved/optimized. When the ratio of the signal-to-noise ratio of the red color to the signal-to-noise ratio of the green color is maintained at a value adjacent to 1.0 regardless of changes in brightness, the deviation between the red color and the green color may be small, and the image quality may be evaluated as excellent.

The graphs illustrated in FIGS. 20A and 20B may be graphs obtained while the controller changes the settings of the image sensor to the first to fifth settings SET1-SET5. Referring to FIG. 20A, the ratio of the signal-to-noise ratio of the red color to the signal-to-noise ratio of the green color may be the closest to 1.0 in the evaluation area 610 of the first test image 600 obtained by applying the first setting SET1 to the image sensor. Also, referring to FIG. 20B, the ratio of the signal-to-noise ratio of the blue color to the signal-to-noise ratio of the green color may also be closest to 1.0 in the evaluation area 610 of the first test image 600. Accordingly, the controller may determine a setting to improve/optimize performance of the image sensor as the first setting SET1 and may apply the first setting SET to the image sensor.

The above-described example embodiments may be used in combination to evaluate performance of the image sensor and to improve/optimize the settings. For example, the controller may obtain a plurality of test images by imaging a test chart while changing settings of the image sensor. Also, the controller may calculate an average level code of pixels according to changes in brightness of an evaluation area in each of the plurality of test images, brightness and a signal-to-noise ratio for each color, and a ratio between signal-to-noise ratios of a portion of colors. The controller may evaluate performance of the image sensor using a portion of the average level code, brightness, signal-to-noise ratio for each color, and the ratio between signal-to-noise ratios of a portion of colors together, and may select the settings of the image sensor such that the image sensor may have improved/optimal performance.

According to some embodiments of inventive concepts, performance of an image sensor may be accurately evaluated. By disposing the evaluation area in the center of the test chart, an SNR dip phenomenon appearing at a specific brightness in the HDR mode may be accurately determined without intervention of other functions of the image sensor. Based on this, the weights of pixel data obtained at different conversion gains may be adjusted to represent the corresponding brightness while the image sensor operates in HDR brightness, thereby improving and/or optimizing performance of the image sensor.

According to the aforementioned example embodiments, performance of various functions provided by the image sensor may be accurately evaluated using a test chart suitable for evaluating performance of the image sensor. Also, by improving/optimizing the settings of the image sensor based on a result of evaluation of performance of the image sensor, the image sensor may be set to provide improved/optimal performance to the user.

While the example embodiments have been illustrated and described above, it will be apparent to those skilled in the art that modifications and variations could be made without departing from the scope of the present disclosure as defined by the appended claims.

What is claimed is:

1. A method of evaluating performance of an image sensor, the method comprising:
    obtaining a plurality of test images by imaging a test chart multiple times using a camera device including an image sensor, the test chart including an evaluation area of which brightness changes along a predetermined first direction, wherein the evaluation area is disposed at a center of each of the plurality of test images, and wherein the first direction is a direction of rotation from a predetermined reference axis;
    calculating a signal-to-noise ratio depending on a position of the evaluation area in each of the plurality of test images; and
    evaluating performance of the image sensor based on the signal-to-noise ratio.

2. The method of claim 1,
    wherein the image sensor includes a plurality of pixels and a logic circuit configured to obtain pixel data from the plurality of pixels, and wherein the image sensor is connected to a controller including an image signal processor configured to generate image data using the pixel data, and wherein the controller obtains the plurality of test images while changing a dual conversion gain (DCG) setting of the image sensor.

3. The method of claim 2, wherein the DCG setting includes a combination ratio between first pixel data output by at least a portion of the plurality of pixels under a first conversion gain condition and second pixel data output by at least a portion of the pixels under a second conversion gain condition.

4. The method of claim 3, further comprising:
adjusting the combination ratio based on a result of evaluating performance of the image sensor.

5. The method of claim 1, wherein the evaluation area has a circular shape.

6. The method of claim 5, wherein a diameter of the evaluation area displayed in each of the plurality of test images is less than ½ of a width of each of the plurality of test images.

7. The method of claim 5, wherein the evaluation area includes a plurality of unit areas disposed in the first direction, and each of the plurality of unit areas has a sectoral shape.

8. The method of claim 7, wherein the number of the plurality of unit areas is 128.

9. The method of claim 1, wherein the signal-to-noise ratio is calculated based on each of brightness of the evaluation area red color of the evaluation area, green color of the evaluation area, and blue color of the evaluation area in each of the plurality of test images.

10. The method of claim 9, wherein performance of the image sensor is evaluated based on distribution of a ratio between a signal-to-noise ratio of the red color and a signal-to-noise ratio of the green color depending on brightness of the evaluation area and a ratio between a signal-to-noise ratio of the blue color and a signal-to-noise ratio of the green color depending on brightness of the evaluation area.

11. The method of claim 1,
wherein the camera device includes an optical unit including at least one main lens,
wherein the image sensor includes a plurality of pixels configured to receive light passing through the optical unit and to generate pixel data based on the light received through the optical unit,
wherein the camera device includes an image processor configured to generate image data using the pixel data generated the plurality of pixels, and
wherein the image processor obtains the plurality of test images while changing a lens shading correction (LSC) setting of the image sensor.

12. A method of evaluating performance of an image sensor, the method comprising:
obtaining a test image by imaging an evaluation area, wherein the evaluation area includes a plurality of unit areas having different levels of brightness;
obtaining an average level code of a pixel in each of the plurality of unit areas displayed in the test image;
obtaining a signal-to-noise ratio of each of brightness, red color, green color, and blue color in each of the plurality of unit areas displayed in the test image;
calculating a ratio between the signal-to-noise ratio of at least one of the red color and the blue color and the signal-to-noise ratio of the green color in each of the plurality of unit areas displayed in the test image; and
evaluating performance of an image sensor imaging the evaluation area based on at least a portion of the average level code, the signal-to-noise ratio, and the ratio in each of the plurality of unity areas displayed in the test image.

13. The method of claim 12,
wherein the average level code includes average level codes corresponding to the brightness, the red color, the green color, and the blue color, and
wherein evaluating the performance comprises determining that the image sensor has better performance as a deviation between the average level codes in each of the plurality of unit areas is smaller.

14. A method of adjusting an image sensor, the method comprising:
obtaining a test image of a test chart including an evaluation area using the image sensor, wherein the evaluation area has a shape of a circle, wherein the evaluation area includes first through $n^{th}$ unit areas arranged in a rotational direction around the circle, and wherein each of the first through $n^{th}$ unit areas has a different level of brightness;
calculating a signal-to-noise ratio (SNR) for each of the first through $n^{th}$ unit areas based on the test image of the test chart; and
adjusting a setting of the image sensor based on calculating the signal-to-noise ratio for each of the first through $n^{th}$ unit areas.

15. The method of claim 14, wherein the first and $n^{th}$ unit areas are adjacent to each other, wherein the first unit area has a highest brightness of the first through $n^{th}$ unit areas, wherein the $n^{th}$ unit area has a lowest brightness of the first through $n^{th}$ unit areas, and wherein brightness of the first through $n^{th}$ unit areas decrease from the first through $n^{th}$ unit areas in the rotational direction.

16. The method of claim 15, wherein each of the first through $n^{th}$ unit areas comprises a sector of the circle.

17. The method of claim 16, wherein each of the first through $n^{th}$ unit areas has a respective uniform brightness in a radial direction away from a center of the evaluation area.

18. The method of claim 14, wherein adjusting the setting of the image sensor comprises adjusting a dual conversion gain (DCG) setting of the image sensor.

19. The method of claim 14, wherein the rotational direction comprises a clockwise direction.

20. The method of claim 14, further comprising:
identifying at least one of the first through $n^{th}$ unit areas having a respective SNR that is lower than a respective SNRs of a preceding unit area that precedes the at least one unit are in the rotational direction and a following unit area that follows the at least one unit area in the rotational direction;
wherein the setting of the image sensor is adjusted based on identifying the at least one of the first through $n^{th}$ unit areas.

* * * * *